(12) United States Patent
Park et al.

(10) Patent No.: US 11,697,211 B2
(45) Date of Patent: Jul. 11, 2023

(54) MOBILE ROBOT OPERATION METHOD AND MOBILE ROBOT

(71) Applicant: LG ELECTRONICS INC., Seoul (KR)

(72) Inventors: Joongtae Park, Seoul (KR); Hyoungrock Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 585 days.

(21) Appl. No.: 16/626,640

(22) PCT Filed: Jun. 12, 2018

(86) PCT No.: PCT/KR2018/006680
§ 371 (c)(1),
(2) Date: Dec. 26, 2019

(87) PCT Pub. No.: WO2019/004633
PCT Pub. Date: Jan. 3, 2019

(65) Prior Publication Data
US 2020/0156256 A1 May 21, 2020

(30) Foreign Application Priority Data

Jun. 30, 2017 (KR) .................. 10-2017-0083628
Jun. 30, 2017 (KR) .................. 10-2017-0083629

(51) Int. Cl.
*G05D 1/00* (2006.01)
*B25J 11/00* (2006.01)
(Continued)

(52) U.S. Cl.
CPC ............. *B25J 11/008* (2013.01); *B25J 5/007* (2013.01); *B25J 9/1666* (2013.01);
(Continued)

(58) Field of Classification Search
CPC ........ B25J 11/008; B25J 5/007; B25J 9/1666; B25J 11/0005; B25J 13/003; B25J 13/08;
(Continued)

(56) References Cited

U.S. PATENT DOCUMENTS 8,849,559 B2    9/2014  Jeong et al.
9,953,535 B1 *  4/2018  Canavor ................ G08G 1/123
(Continued)

FOREIGN PATENT DOCUMENTS

| KR | 10-2010-0094213 A | 8/2010 |
| KR | 10-2011-0046213 A | 5/2011 |
| KR | 10-2011-0050971 A | 5/2011 |
| KR | 10-2015-0126482 A | 11/2015 |

*Primary Examiner* — Harry Y Oh
*Assistant Examiner* — Sohana Tanju Khayer
(74) *Attorney, Agent, or Firm* — Birch, Stewart, Kolasch & Birch, LLP

(57) ABSTRACT

A mobile robot operation method according to an aspect of the present invention includes: a step for receiving a guidance destination input; a step for generating a global path to the received guidance destination; a step for generating a left travel guideline and a right travel guideline on the left side and the right side of the generated global path; and a step for generating a local path within a travelable range between the left travel guideline and the right travel guideline. Accordingly, the robot operation method may generate a safe and optimal guidance path when providing a guidance service.

20 Claims, 22 Drawing Sheets

(51) Int. Cl.
| | |
|---|---|
| *B25J 5/00* | (2006.01) |
| *B25J 9/16* | (2006.01) |
| *B25J 13/00* | (2006.01) |
| *B25J 13/08* | (2006.01) |
| *G01C 21/36* | (2006.01) |
| *G05D 1/02* | (2020.01) |
| *G01C 21/00* | (2006.01) |
| *G01C 21/16* | (2006.01) |

(52) U.S. Cl.
CPC ......... *B25J 11/0005* (2013.01); *B25J 13/003* (2013.01); *B25J 13/08* (2013.01); *G01C 21/3608* (2013.01); *G01C 21/3664* (2013.01); *G01C 21/3881* (2020.08); *G05D 1/0212* (2013.01); *G05D 1/0223* (2013.01); *G01C 21/16* (2013.01); *G05D 1/0214* (2013.01)

(58) Field of Classification Search
CPC ......... B60W 60/0016; B60W 2520/10; B60W 2554/40; G01C 21/32; G01C 21/3608; G01C 21/3664; G01C 21/16; G05D 1/0212; G05D 1/0223; G05D 1/0214
See application file for complete search history.

(56) References Cited

U.S. PATENT DOCUMENTS

| | | | |
|---|---|---|---|
| 2010/0211244 A1* | 8/2010 | Jeong | G06T 19/003 |
| | | | 701/25 |
| 2011/0098874 A1* | 4/2011 | Choi | G05D 1/0274 |
| | | | 901/1 |
| 2011/0196576 A1* | 8/2011 | Stahlin | B62D 15/025 |
| | | | 701/41 |
| 2014/0334713 A1 | 11/2014 | Kim | |
| 2016/0140847 A1* | 5/2016 | Kawamata | G08G 1/163 |
| | | | 701/36 |
| 2017/0057087 A1* | 3/2017 | Lee | G01C 21/3453 |
| 2017/0166204 A1* | 6/2017 | Yoo | G08G 1/16 |
| 2017/0269602 A1* | 9/2017 | Nakamura | G01C 21/3492 |
| 2017/0332862 A1* | 11/2017 | Jun | A47L 9/2873 |
| 2017/0364087 A1* | 12/2017 | Tang | G05D 1/0274 |
| 2018/0003516 A1* | 1/2018 | Khasis | G08G 1/207 |
| 2018/0144201 A1* | 5/2018 | Yoshihira | B60R 21/00 |
| 2018/0292834 A1* | 10/2018 | Kindo | B60W 50/0097 |
| 2018/0345963 A1* | 12/2018 | Maura | G05D 1/0088 |
| 2019/0004524 A1* | 1/2019 | Wang | B60W 30/09 |
| 2019/0310091 A1* | 10/2019 | Maeda | G01C 21/30 |

* cited by examiner

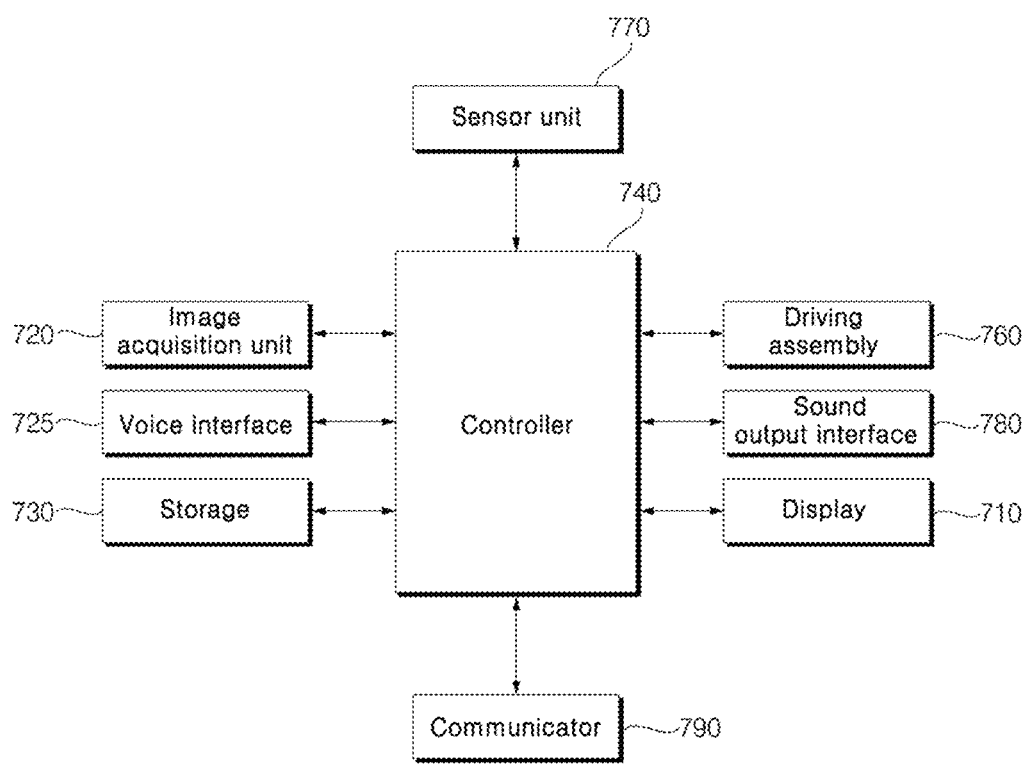

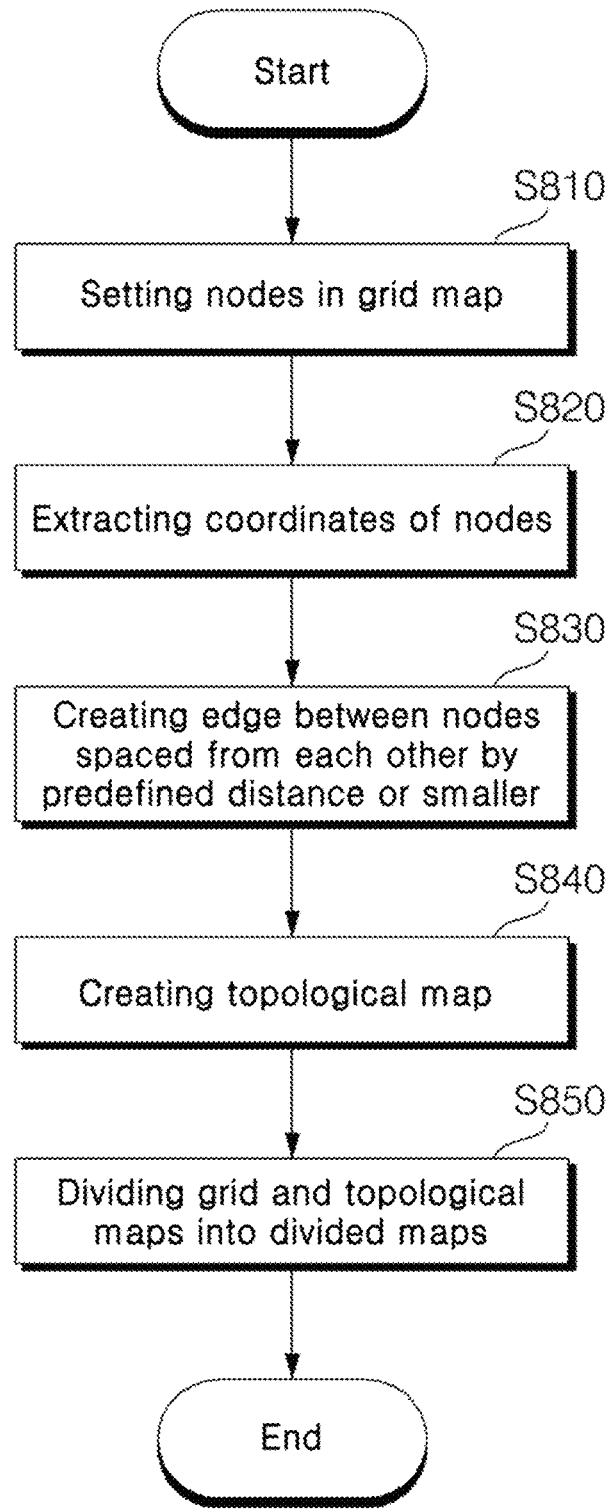

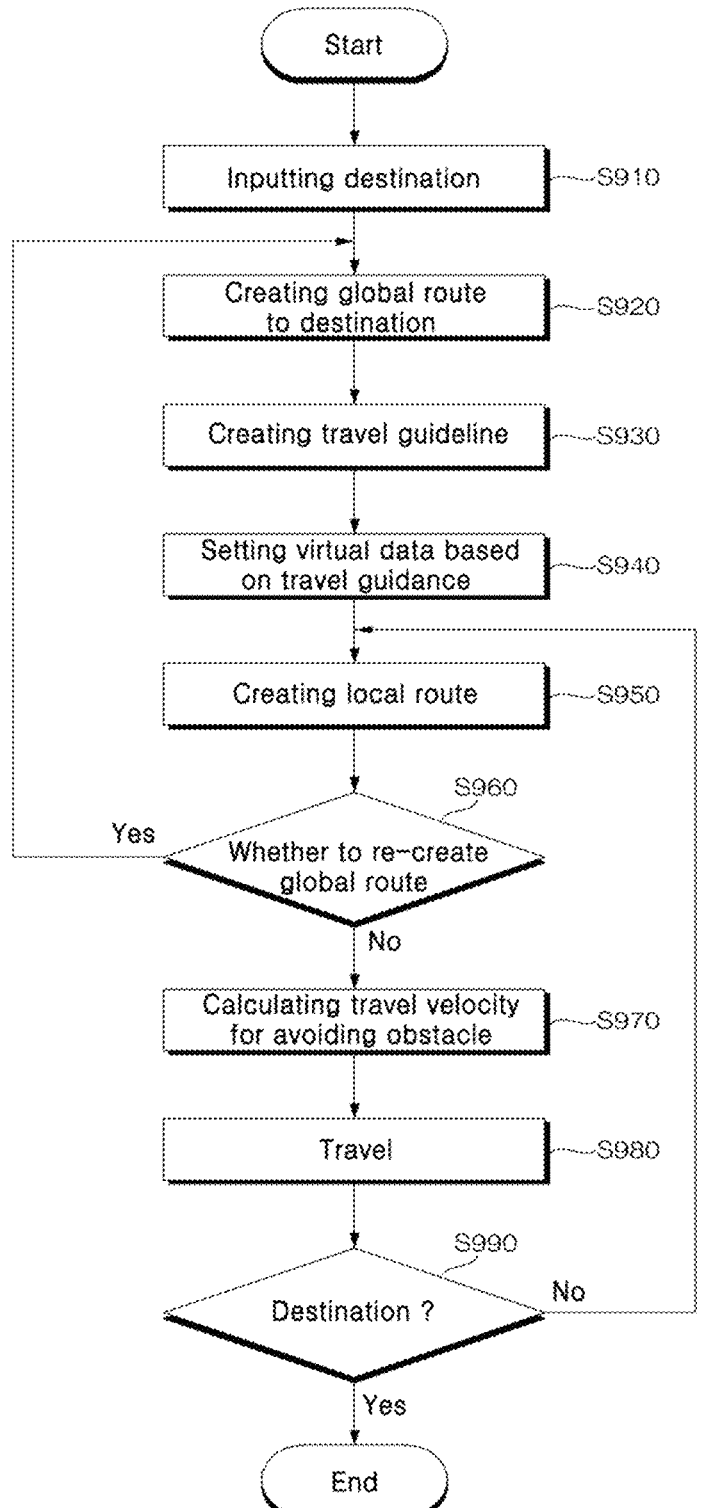

MOBILE ROBOT OPERATION METHOD AND MOBILE ROBOT

CROSS REFERENCE TO RELATED APPLICATIONS

This application is the National Phase of PCT International Application No. PCT/KR2018/006680, filed on Jun. 12, 2018, which claims priority under 35 U.S.C. 119(a) to Patent Application Nos. 10-2017-0083628 and 10-2017-0083629, filed in the Republic of Korea on Jun. 30, 2017, all of which are hereby expressly incorporated by reference into the present application.

TECHNICAL FIELD

The present disclosure relates to a moving robot and a method of operating the same, and more particularly, to a moving robot which may provide guidance and various services to people in public places, and a method of operating the same.

DESCRIPTION OF RELATED ART

In public places such as airports, train stations, ports, department stores, and performance halls, electric signboards and guide information display board, etc. provide information to users. However, the electric signboard, guide information display board, etc., only unilaterally delivers some information selected by a service provider, and may not satisfy needs of individual users.

Further, recently, introduction of kiosks that provide information and services to users using multimedia devices such as display means, touch screens, and speakers are increasing. However, even in this case, the user must operate the kiosk directly, Thus, people who have difficulty in using the device may have inconvenience to use the kiosk. The kiosk could not actively respond to the needs of users.

Robots have been developed for industrial use and have been a part of factory automation. Recently, a field of applying the robots thereto has been further expanded, such that medical robots, aerospace robots, etc. have been developed. Further, a household robot that may be used in ordinary homes is being made.

Therefore, researches on a scheme to provide various services in public places using robots are increasing. Further, there is a demand for a method that may generate an optimal and safe guidance route when providing a guidance service. Further, there is a demand for a method that may respond quickly to user needs.

DISCLOSURE

Technical Purposes

A purpose of the present disclosure is to provide a moving robot that may provide various services such as guidance services in public places, and a method of operation thereof.

A purpose of the present disclosure is to provide a moving robot that may generate an optimal and safe guidance route while providing guidance services, and a method of operation thereof.

A purpose of the present disclosure is to provide a moving robot which may quickly generate a route to a guidance destination to improve a guidance service providing rate and a robot travel performance, and a method of operating the same.

A purpose of the present disclosure is to provide a moving robot that may easily provide information displayed on a display in a service provision process such as a guidance service providing process, and a method of operating the same.

A purpose of the present disclosure is to provide a moving robot that may efficiently use a system resource, and a method of operating the same.

Technical Solutions

A method for operating a moving robot according to one aspect of the present disclosure to achieve the above or other purposes may include receiving a guide destination input; creating a global route to the received guide destination; creating a left travel guideline and a right travel guideline respectively on left and right sides around the created global route; and creating a local route within a travelable range, wherein the travelable range is defined between the left travel guideline and the right travel guideline. Thus, the method may create a safe and optimal guidance route when providing a guidance service.

A method for operating a moving robot according to another aspect of the present disclosure to achieve the above or other purposes may include receiving a guide destination input; creating a global route to the received guide destination; creating a left travel guideline or a right travel guideline respectively on a left side or a right side around the created global route; and creating a local route to one of a plurality of nodes constituting the global route.

A method for operating a moving robot according to another aspect of the present disclosure to achieve the above or other purposes may include setting a plurality of node nodes in a grid map; extracting coordinates of the plurality of nodes; creating an edge between nodes, wherein the nodes are spaced from each other by a distance smaller than or equal to a predefined value, and then creating, a topological map having the edge; and dividing the grid map into divided maps, each dived map having a predefined size. Thus, the robot may use the divided map to quickly create a route to the guide destination and improve the guidance service provision speed and the robot travel performance.

Technical Effects

According to at least one of the embodiments of the present disclosure, various services such as guidance services may be provided in public areas.

Further, according to at least one of the embodiments of the present disclosure, the robot may create an optimal and safe guidance route when providing guidance services.

Further, according to at least one of the embodiments of the present disclosure, the robot may quickly create a route to a guidance destination, such that a guidance service rate and a robot travel performance may be improved.

Further, according to at least one of the embodiments of the present disclosure, the robot may easily provide information displayed on a display in a service provision process such as a direction guide process.

Further, according to at least one of the embodiments of the present disclosure, the moving robot that may efficiently use system resources, and a method of operation thereof may be realized.

Various other effects may be directly or inherently incorporated in detailed descriptions of the present disclosure as described below.

BRIEF DESCRIPTION OF DRAWINGS

FIG. 7 is a block diagram showing a control relationship between major components of a moving robot according to one embodiment of the present disclosure.

FIG. 8 is a flowchart illustrating a method of operating a moving robot according to one embodiment of the present disclosure.

FIG. 9A and FIG. 9B are flowcharts illustrating a method of operating a moving robot according to one embodiment of the present disclosure.

DETAILED DESCRIPTIONS

Figure 1:
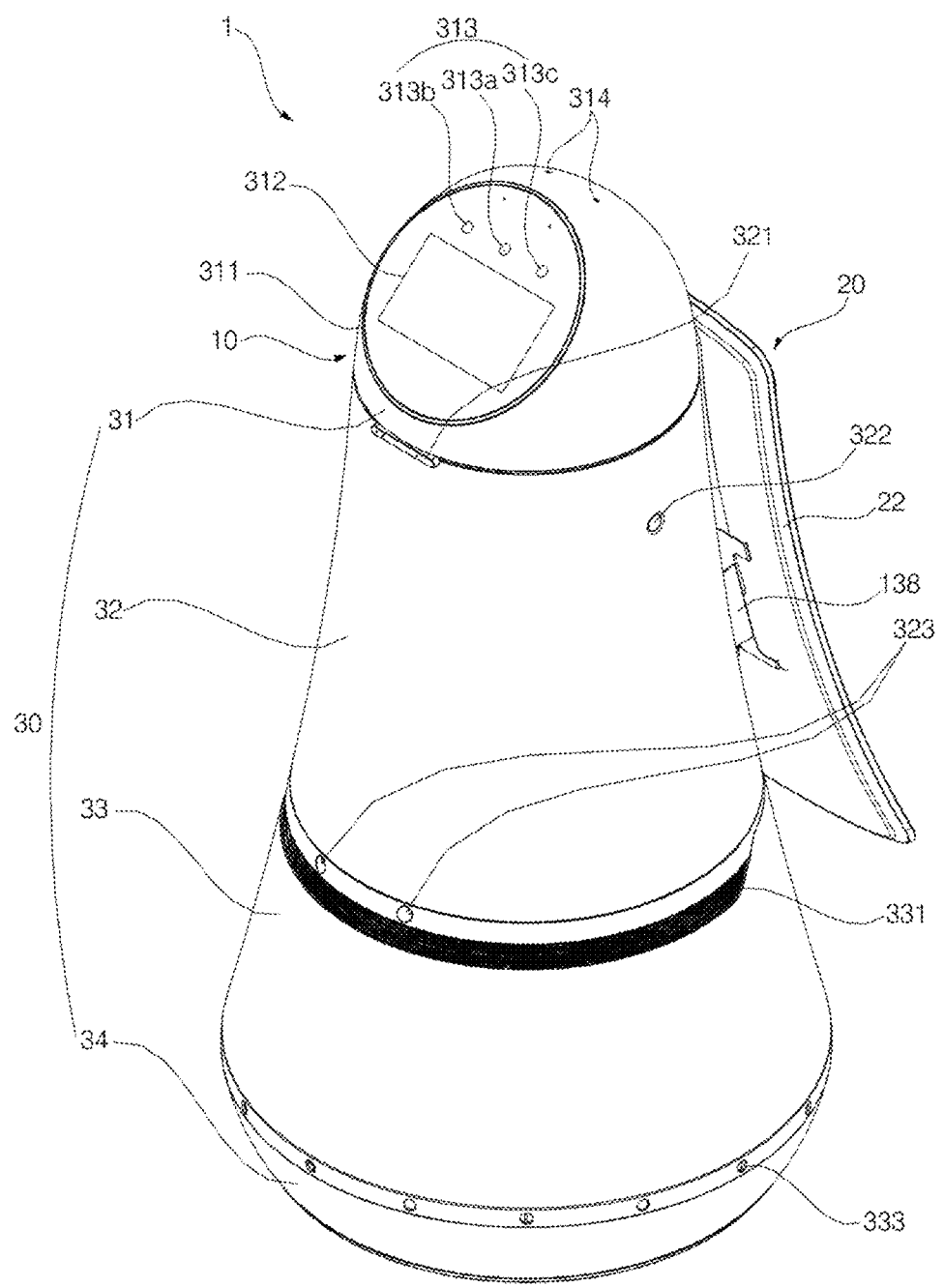
FIG. 1 is a perspective view of a moving robot according to one embodiment of the present disclosure.

Hereinafter, exemplary embodiments of the present disclosure will be described in detail with reference to the accompanying drawings. However, the present disclosure is not limited to the embodiments and may be modified in various ways.

In the drawings, illustrations of parts not related to the description of the present disclosure are omitted such that the present disclosure is clearly and briefly described. Throughout the specification, the same reference numerals are used for the same or extremely similar parts.

In one example, suffixes "module" and "unit" for a component used in the following description are merely given in consideration of easily writing the present disclosure, and do not in themselves have a particularly important meaning or role. Thus, the "module" and "unit" may be used interchangeably with each other.

Figure 2:
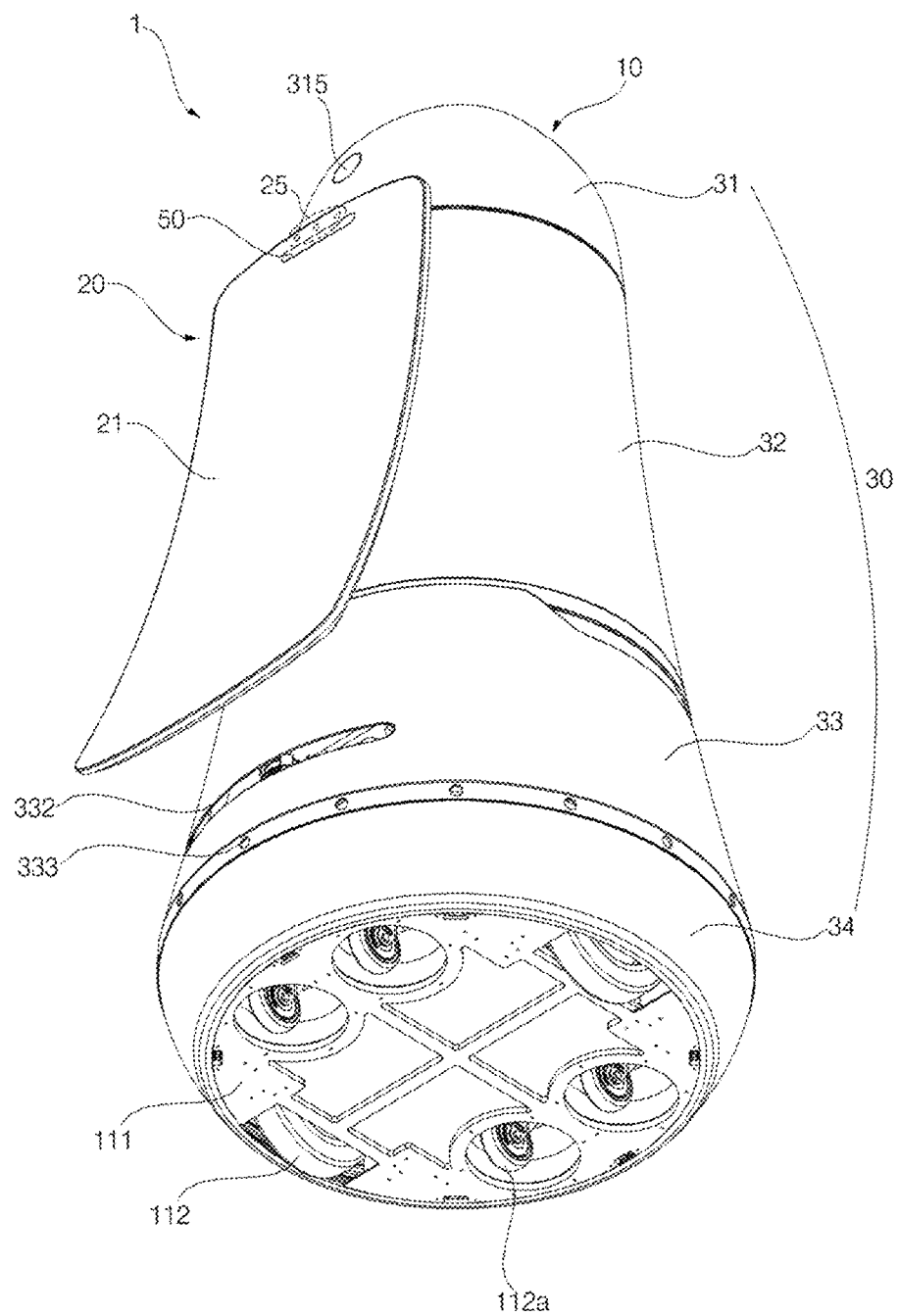
FIG. 2 is a bottom perspective view of a moving robot according to one embodiment of the present disclosure.
Figure 3:
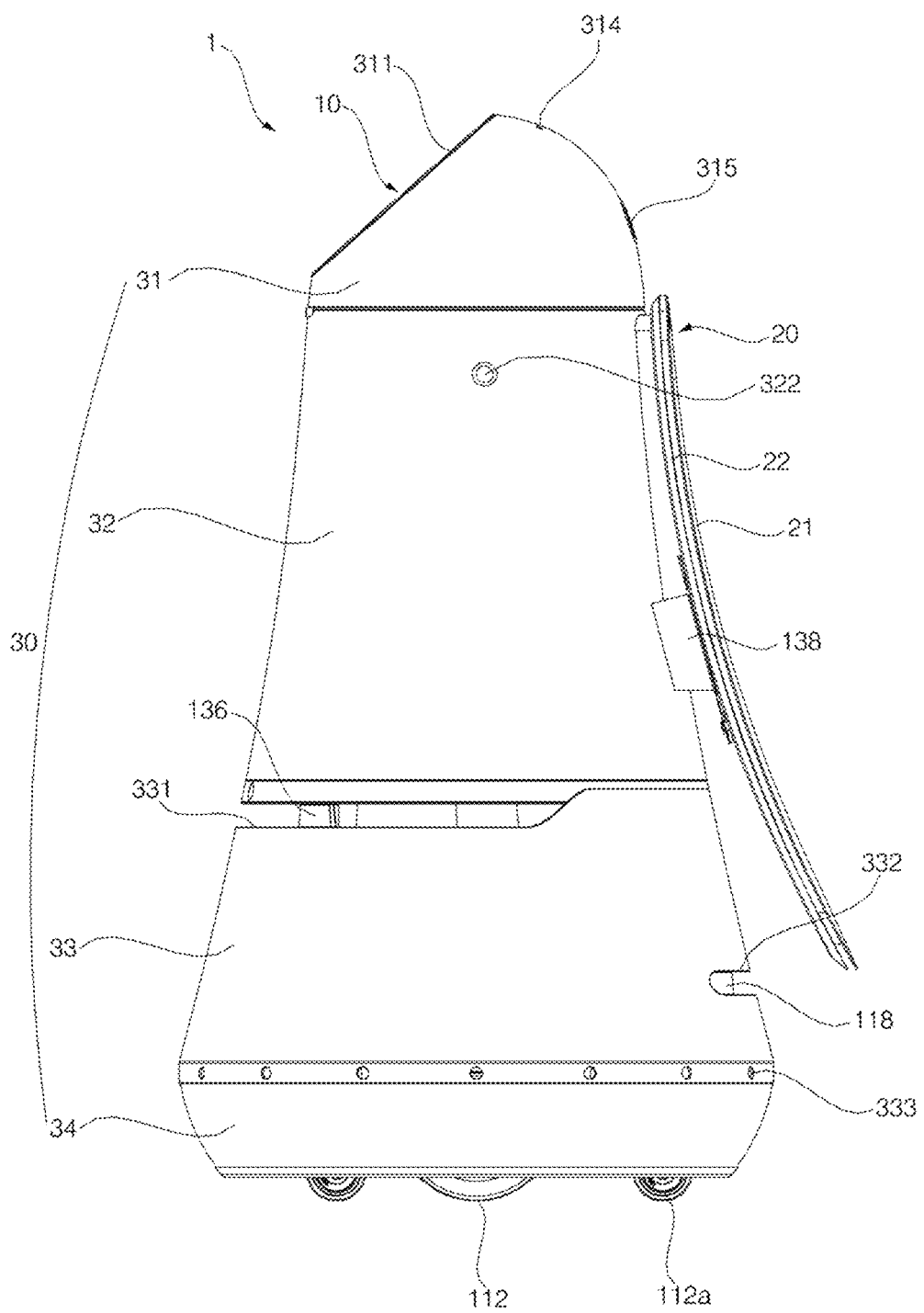
FIG. 3 shows a side view of a moving robot according to one embodiment of the present disclosure.
Figure 4:
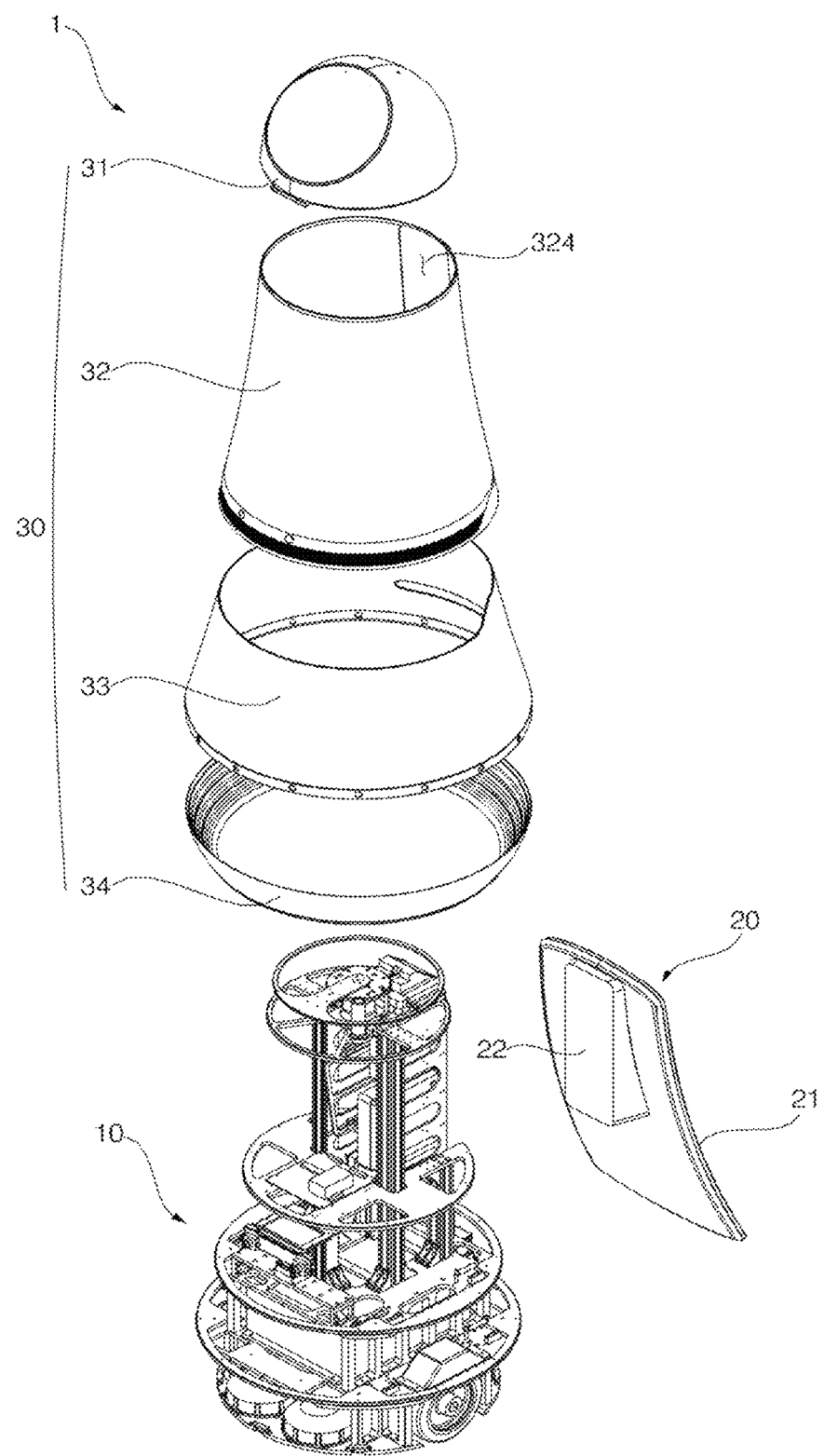
FIG. 4 is an exploded perspective view of a moving robot according to one embodiment of the present disclosure.

FIG. 1 is a perspective view of a moving robot according to one embodiment of the present disclosure. FIG. 2 is a bottom perspective view of the moving robot. FIG. 3 is a side view of the moving robot. FIG. 4 is an exploded perspective view of the moving robot.

Referring to FIG. 1 to FIG. 4, a moving robot 1 according to one embodiment of the present disclosure may include a main body 10 forming an exterior appearance and accommodating various components therein.

The main body 10 may be formed in an elongate manner in a vertical direction and may taper upwardly with rolypoly shape.

The main body 10 may include a casing 30 that forms an appearance of the moving robot 1. The casing 30 may include a top cover 31, a first middle cover 32 disposed below the top cover 31, a second middle cover 33 disposed below the first middle cover 32, and a bottom cover 34 disposed below the second middle cover 33. In this connection, the first middle cover 32 and the second middle cover 33 may constitute a single middle cover.

The top cover 31 is positioned on a top of the moving robot 1, and may have a hemisphere or dome shape. The top cover 31 may be positioned at a vertical level lower than a height of an adult to facilitate receiving an input from the user. Further, the top cover 31 may be configured to be rotatable at an angle.

In one example, the top cover 31 and a head structure 15 therein may be placed at a top of the moving robot 1 and may have a shape and function similar to that of a human head and may interact with the user. Thus, a combination of the top cover 31 and the head structure 15 therein may be referred to as a head. Further, a rest portion placed below the head may be referred to a body.

An user interface 311 may be formed on a front face of the top cover 31. The user interface 311 receives a command from the user. To this end, the user interface 311 may include a display 312 for receiving a touch input from the user.

Hereinafter, the display 312 of the user interface 311 may be referred to as a head display 312, while a display 20 disposed on the body may be referred to as a body display assembly 20.

The head display 312 may be embodied as a touch screen forming a layer structure with a touch pad. The head display 312 may be used as an input device capable of receiving information via a user's touch in addition to an output device.

The user interface 311 may be inclined upwards at an angle so that the user may easily manipulate the user interface while looking down the head display 312. For example, the user interface 311 may be disposed at a face where a portion of the top cover 31 is cut off. Thus, the head display 312 may be inclined.

In another example, the user interface 311 may have a circular shape as a whole. The user interface 311 may have a shape similar to a shape of a human face.

For example, the user interface 311 may have a circular shape. One or more structures to represent a human eye, nose, mouth, eyebrow, and the like may be disposed on the user interface 311.

That is, a specific structure may be disposed or a specific image to express a human eye, nose, mouth, eyebrow, and the like may be formed on the user interface 311, or specific paint is painted on the user interface 311. As such, the user interface 311 may have a human face shape to provide an emotional feeling to the user. Furthermore, when a robot having a human face shape travels, this may give a feeling as when a person is moving, thereby generating a friendship with the robot.

In another example, one or more images for representing a human eye, nose, mouth, eyebrow, etc. may be displayed on the head display 312.

That is, not only information related to a route guidance service but also various images for expressing a shape of a face of a person may be displayed on the head display 312. Then, an image for expressing a predetermined facial expression may be displayed on the head display 312 at a predetermined time interval or at a specific time.

In one example, in FIG. 1, a direction in which the user interface 311 faces may be defined as a "forward" direction, while an opposite direction thereto is defined as a "rear" direction.

Further, a head camera 313 for recognition of people or objects may be adjacent to the user interface 311.

The head camera 313 may be disposed above the head display 312. The head camera 313 may include a 2D camera 313a and RGBD sensors 313b and 313c.

The 2D camera 313a may act as a sensor for recognizing a person or an object based on a 2-dimensional image.

Further, each of the RGBD (Red, Green, Blue, Distance) sensors 313b and 313c may be a sensor for acquiring a position or face image of a person. Each of the RGBD sensors 313b and 313c may detect a person or object using a captured image having depth data as obtained from a camera with RGBD sensors or other similar 3D imaging device.

In order to accurately detect a position or face image of a person, a plurality of RGBD sensors 313b and 313c may be disposed. For example, as shown in FIG. 1, two RGBD sensors 313b and 313c may be respectively arranged on left and right sides to the 2D camera 313a.

Although not shown, the user interface 311 may further include a physical button for directly receiving a command from the user.

Further, a microphone 314 may be disposed on the top cover 31.

The microphone 314 receives a voice command spoken from the user. In one example, to accurately receive the user's voice command, a plurality of microphones 314 may be placed at 4-top points of the top cover 31 respectively. Accordingly, while the moving robot 1 is driving or the top cover 31 is rotating, the user's voice command may be correctly input.

In one embodiment of the present disclosure, when the moving robot 1 is driving, the top cover 31 may be rotated such that the user interface 311 faces in a driving direction. Then, when the moving robot 1 receives a command (e.g., voice command) from the user while driving, the top cover 31 may be rotated such that user interface 311 faces toward the user.

In contrast, when the moving robot 1 receives a command from the user while driving, the top cover 31 may be rotated in a direction opposite to the driving direction of the moving robot 1. That is, the top cover 31 may be rotated toward the body display assembly 20. Accordingly, the user may manipulate the user interface 311 while viewing the route guidance service information displayed on the body display assembly 20.

Figure 5:
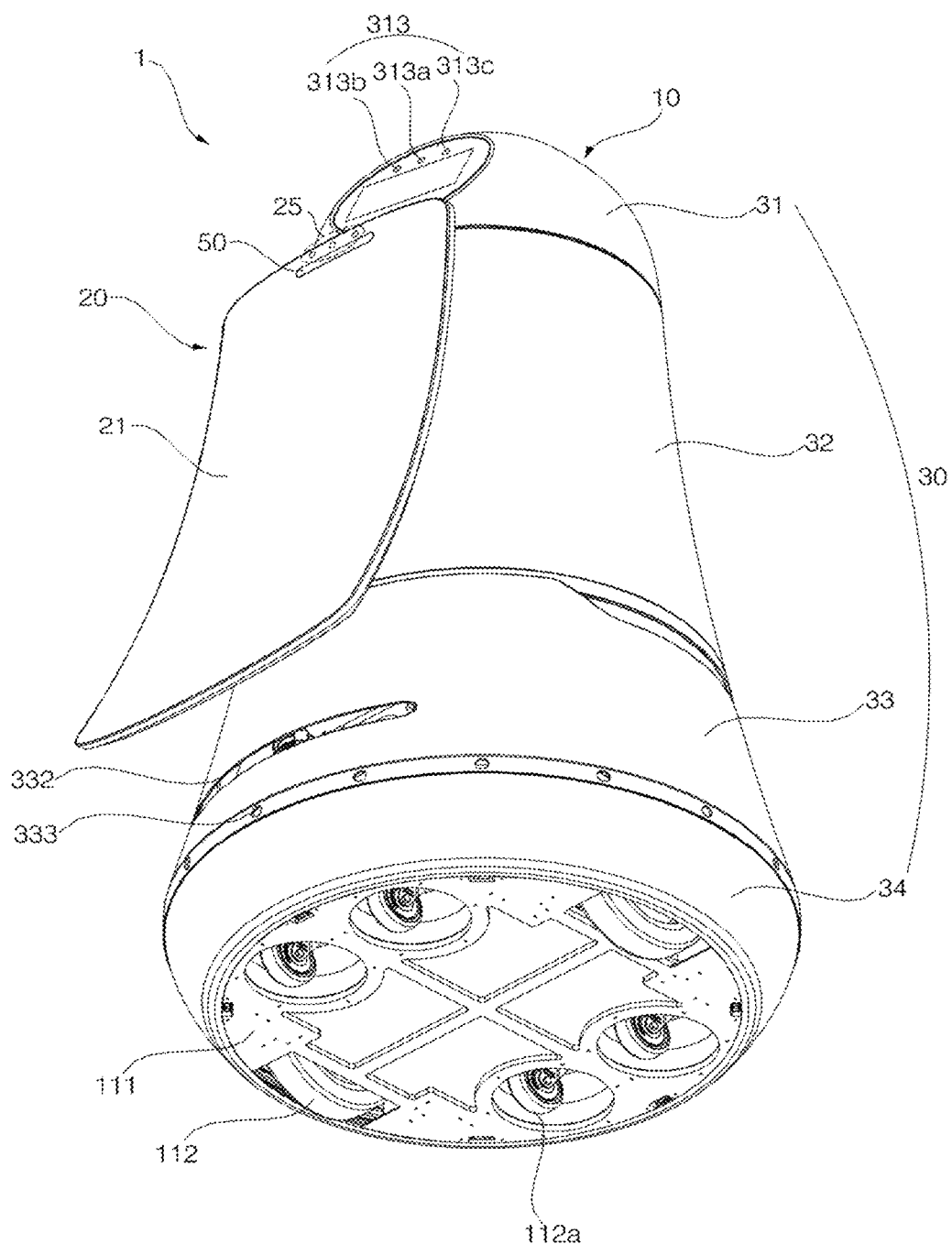
FIG. 5 shows a state in which displays of a moving robot are arranged according to one embodiment of the present disclosure.

FIG. 5 shows an arrangement of the displays 312 and 20 of the moving robot 1 according to one embodiment of the present disclosure.

Referring to FIG. 5, when the moving robot 1 receives a command from the user or is waiting, the displays 312 and 20 align with each other in one direction, thereby making it easier for the user in the public place to see the information displayed on the two displays 312 and 20.

In one example, a direction in which the user interface 311 faces and a direction in which the body display assembly 20 faces may be opposite to each other. In this case, for example, the user interface 311 may face in one direction, while the display 20 may face in an opposite direction. Information displayed on the user interface 311 may be viewed in one direction or information displayed on the body display assembly 20 may be viewed in the opposite direction.

Preferably, the direction in which the user interface 311 faces and the direction in which the body display assembly 20 faces may vary while the moving robot 1 is traveling or stationary.

For example, when the moving robot 1 is traveling, the direction in which the user interface 311 faces and the direction in which the body display assembly 20 faces may be opposite to each other, as illustrated in FIG. 1.

Further, when the moving robot 1 is in a waiting mode, the direction in which the user interface 311 faces and the direction in which the body display assembly 20 faces may be the same as illustrated in FIG. 5.

Further, the top cover 31 may further include an emergency manipulation button 315. The emergency manipulation button 315 may perform a function of immediately stopping an operation of the moving robot 1 while the robot stops to move or while the robot 1 is traveling. In one example, the emergency manipulation button 315 may be positioned at a rear face of the moving robot 1 to facilitate manipulation of the emergency manipulation button 315 by the user even when the moving robot 1 forwardly travels.

The first middle cover 32 may be disposed below the top cover 31. Various electronic components including a substrate may be positioned inside the first middle cover 33. Further, the first middle cover 32 may have a cylindrical shape that increases in diameter from a top to a bottom.

More preferably, the first middle cover 32 may include an RGBD sensor 321.

The RGBD sensor 321 may perform a function of detecting a collision between the moving robot 1 and an obstacle while the moving robot 1 is driving. To this end, the RGBD sensor 321 may face in a direction in which the moving robot 1 travels, that is, may be in front of the first middle cover 32. For example, the RGBD sensor 321 may be located on the top of the first middle cover 32 in consideration of an obstacle present in front of the moving robot 1 or of a height of a person. However, the position of the RGBD sensor 321 is not limited thereto. The RGBD sensor 321 may be disposed at various positions in front of the first middle cover 32.

According to an embodiment, the RGBD sensor 321 is not disposed in front of the first middle cover 32, but the function of the RGBD sensor 321 may be performed by the head camera 313.

Further, the first middle cover 32 further includes a hole for speaker 322.

The hole for speaker 322 may be configured for transmitting a sound generated from the speaker to an outside. The hole for speaker 322 may be formed in an outer circumferential surface of the first middle cover 32 or may be formed in a singular number. Alternatively, however, a plurality of holes for speaker 322 may be spaced apart from each other and may be arranged on the outer circumferential surface of the first middle cover 32.

Further, the first middle cover 32 further includes an hole 323 for a stereo camera.

The hole 323 for the stereo camera may be defined for operating a stereo camera (137 in FIG. 6) installed inside the main body 10. For example, the hole 323 for the stereo camera may be formed at a front lower end of the first middle cover 32. Accordingly, the stereo camera 137 may photograph a front region of the moving robot 1 through the hole 323 for the stereo camera.

The second middle cover 33 may be disposed below the first middle cover 32. Inside the second middle cover 33, there may be a battery and a lidar for autonomous travel. Like the first middle cover 32, the second middle cover 33 may have a cylindrical shape that increases in diameter from a top to a bottom. Further, an outer face of the second middle cover 33 may be connected to an outer face of the first middle cover 32 without a step therebetween. That is, the outer face of the second middle cover 33 and the outer face of the first middle cover 32 may be smoothly connected to each other, so that the appearance thereof may be beautiful.

Further, each of the first middle cover 32 and the second middle cover 33 has a cylindrical shape that increases in diameter from a top to a bottom and tapers upwards. Therefore, an impact generated when the main body 10 collides with a person or an obstacle may be alleviated.

Further, the second middle cover 33 includes a first cut away 331.

The first cut away 331 may be formed laterally in a front face of the outer circumferential surface of the second middle cover 33. The first cut away 331 may be formed by cutting away a portion of the second middle cover 33 so that a front lidar sensor 316 to be described later is operable.

Specifically, the first cut away 331 may be cut to a predetermined length in a radial direction from a front outer peripheral surface of the second middle cover 33. In this connection, the front lidar 136 is located inside the second middle cover 33. Then, the first cut away 331 may be formed by cutting a circumferential portion of the second middle cover 33 in the outer circumferential surface of the second middle cover 33 corresponding to a position of the front lidar 136. That is, the first cut away 331 and the front lidar 136 may face each other. Thus, the front lidar 136 may be exposed to an outside through the first cut away 331.

In one example, the first cut away 331 may be cut away by 270 degrees along the perimeter in the front face of the second middle cover 33. A reason why the first cut away 331 should be formed in the second middle cover 33 is to prevent a laser emitted from the front lidar 136 from being directly irradiated into an eyes of an adult or a child.

Further, the second middle cover 33 may further include a second cut-away 332.

The second cut-away 332 may be formed laterally in a rear face of the outer circumferential surface of the second middle cover 33. The second cut-away 332 is a cut away portion of the second middle cover 33 to allow a rear lidar 118 to be described later to function.

Specifically, the second cut-away 332 may be cut away by a predefined length in a radial direction in a rear outer peripheral surface of the second middle cover 33. In this connection, the rear lidar 118 is positioned inside the second middle cover 33. Further, the second cut-away 332 may be formed by cutting away a portion along a circumference of the second middle cover 33 at a position corresponding to a position of the rear lidar 118. Thus, the rear lidar 118 may be exposed to an outside through the second cut-away 332. In one example, the second cut-away 332 may be cut away by 130 degrees along the circumference of the rear face of the second middle cover 33.

In the present embodiment, the first cut-away 331 may be spaced apart in the vertical direction from the second cut-away 332 so as not to be connected to the second cut-away 332. Further, the first cut-away 331 may be positioned above the second cut-away 332.

When the first cut-away 331 and the second cut-away 332 are positioned at the same vertical level, laser emitted from a lidar of one moving robot may be irradiated to a lidar of another moving robot. Thus, lasers emitted from the lidars of the moving robots may interfere with each other, thereby making an accurate distance detection difficult. In this case, it becomes impossible to detect a distance between a moving robot and an obstacle and thus a normal travel of the robot may be difficult, and thus the moving robot and obstacle may encounter with each other.

Further, an ultrasonic sensor 333 may be disposed on the second middle cover 33.

The ultrasonic sensor 333 may be configured for measuring a distance between an obstacle and the moving robot 1 using an ultrasonic signal. The ultrasonic sensor 333 may perform a function for detecting an obstacle in proximity to the moving robot 1.

For example, a plurality of the ultrasonic sensors 333 may be arranged in a circular manner in order to detect obstacles as close to the moving robot 1 in all directions. The plurality of ultrasonic sensors 333 may be arranged at a regular spacing along a circumference of a lower end of the second middle cover 33.

The bottom cover 34 may be disposed below the second middle cover 33. Wheels 112 and casters 112a may be positioned inside the bottom cover 34. Unlike the first middle cover 32 and the second middle cover 33, the bottom cover 34 may have a cylindrical shape that decreases in diameter from a top to a bottom. That is, the main body 10 has a shape of a roly-poly as a whole, thereby reducing an amount of impact applied to the robot in a collision event. A bottom portion of the main body 10 has an inwardly recessed structure to prevent human feet from getting caught in the robot's wheels.

In detail, a base 111 may be positioned inside the bottom cover 34.

The base 111 may define a bottom of the moving robot 1.

Further, the base 111 may be equipped with the wheels 112 for travel of the moving robot 1. Left and right wheels 112 may be positioned at the left and the right sides of the base 111 respectively.

Further, the base 111 may be equipped with the casters 112a to assist the travel of the moving robot 1. In this connection, a plurality of caster 112a may be disposed for manual travel of the moving robot 1. In one example, front and rear casters 112a may be positioned at front and rear sides of the base 111 respectively.

According to the caster structure as described above, when the moving robot 1 is powered off or an operator needs to move the moving robot 1 manually, the operator may move the robot by pushing the moving robot 1 without too much effort.

The body display assembly 20 may be formed in an elongate manner in a vertical direction on one side of the moving robot 1.

In detail, the body display assembly 20 may include a body display 21 and a support 22.

The body display 21 may be positioned in rear of the first middle cover 32. The body display 21 may output visual information (e.g., airport gate query information, road guide service information, etc.) related to a currently available service.

Further, the body display 21 may be configured as a curved display with a predefined curvature as curved outwardly. That is, the body display 21 may have a concave shape entirely. Further, the body display 21 may be inclined rearwards as it goes downwardly. That is, a spacing between the body display 21 and the casing 30 may increase as it goes from a top to a bottom.

According to the display structure described above, information displayed on the body display 21 is clearly visible to the user while the user is present at a position far from the moving robot 1. Further, the information displayed on the body display 21 may not be visually distorted at various angles to the user.

Further, according to an embodiment of the present disclosure, the moving robot 1 may travel, in front to the user, along a route set to guide a route to the user. Further, the user may follow the moving robot 1 and view the body display assembly 20 installed at a rear face of the moving robot 1. That is, when the moving robot 1 travels for a road guide, the user may easily follow the moving robot 1 and view the information displayed on the body display assembly 20.

Further, a top of the body display 21 may extend to a top of the first middle cover 32. A bottom of the body display 21 may extend to the second cut-away 332. In this embodiment, the bottom of the body display 21 should not extend beyond the second cut-away 332. When the body display 21 extends to cover the second cut-away 332, the laser emitted from the rear lidar 118 hits the bottom of the body display 21. Accordingly, the moving robot 1 may not detect a distance detection to an obstacle positioned behind the robot.

In one example, the support 22 may serve to keep the body display 21 to be positioned behind the first middle cover 32. The support 22 may extend from a back face of the body display assembly 20. The support 22 may be elongated in a vertical direction on the back of the body display 21 and may be inclined rearwards as it goes downwardly.

Further, the support 22 may penetrate the back face of the first middle cover 32 and then be inserted into the first middle cover 32. To this end, a through hole 324 through which the support 22 may penetrate may be formed in the rear face of the first middle cover 32. The through hole 324 may be formed by cutting a portion of the rear outer circumferential surface of the first middle cover 32.

Further, the body display assembly 20 may be fixed to the main body 10 via a separate fixing member 138.

Inside the main body 10, the fixing member 138 may be provided to secure the body display assembly 20 to the main body 10. The fixing member 138 has one end fixed to the main body 10 and the other end fixed to the body display assembly 20. To this end, the other end of the fixing member 138 may penetrate the through hole 324 and protrude out of the casing 30. That is, the support 22 and the fixing member 138 may be positioned together in the through hole 324.

In the present embodiment, the body display assembly 20 may be fastened to the fixing member 138 by a fastener. In this connection, the support 22 of the body display assembly 20 may be mounted on a rear face of the fixing member 138. In other words, the support 20 may be placed on a rear face of the fixing member 138, and a portion of the fixing member 138 may be fixed to a portion of the body display assembly 20. This display fixing structure may allow the body display assembly 20 to be stably positioned behind the first middle cover 32.

In one example, the body display assembly 20 may further include a ticket inlet 50. In this embodiment, the ticket inlet 50 is disposed in the body display assembly 20. However, the present disclosure is not limited thereto. the ticket inlet 50 may be placed in a different portion of the moving robot 1.

According to one embodiment of the present disclosure, when a ticket such as a boarding ticket is put into the ticket inlet 50, the robot 1 may scan barcodes, QR codes, etc. included in the ticket.

Further, the moving robot 1 may display a scan result on the body display 21, and may provide gate information and counter information according to the scan result to the user.

In one example, the body display assembly 20 may further include a body camera 25 for identification and tracking of a guide target.

The body camera 25 may be embodied as a 3D sensor such as an RGBD camera sensor. In a guide mode, presence or absence of a guide target, a distance from the moving robot 1 to the guide target, and a moving velocity of the guide target may be sensed by the body camera 25.

According to an embodiment, the moving robot 1 may not include the body camera 25, but may further include a sensor for identifying and tracking a guide target as disposed at another portion of the robot.

Figure 6:
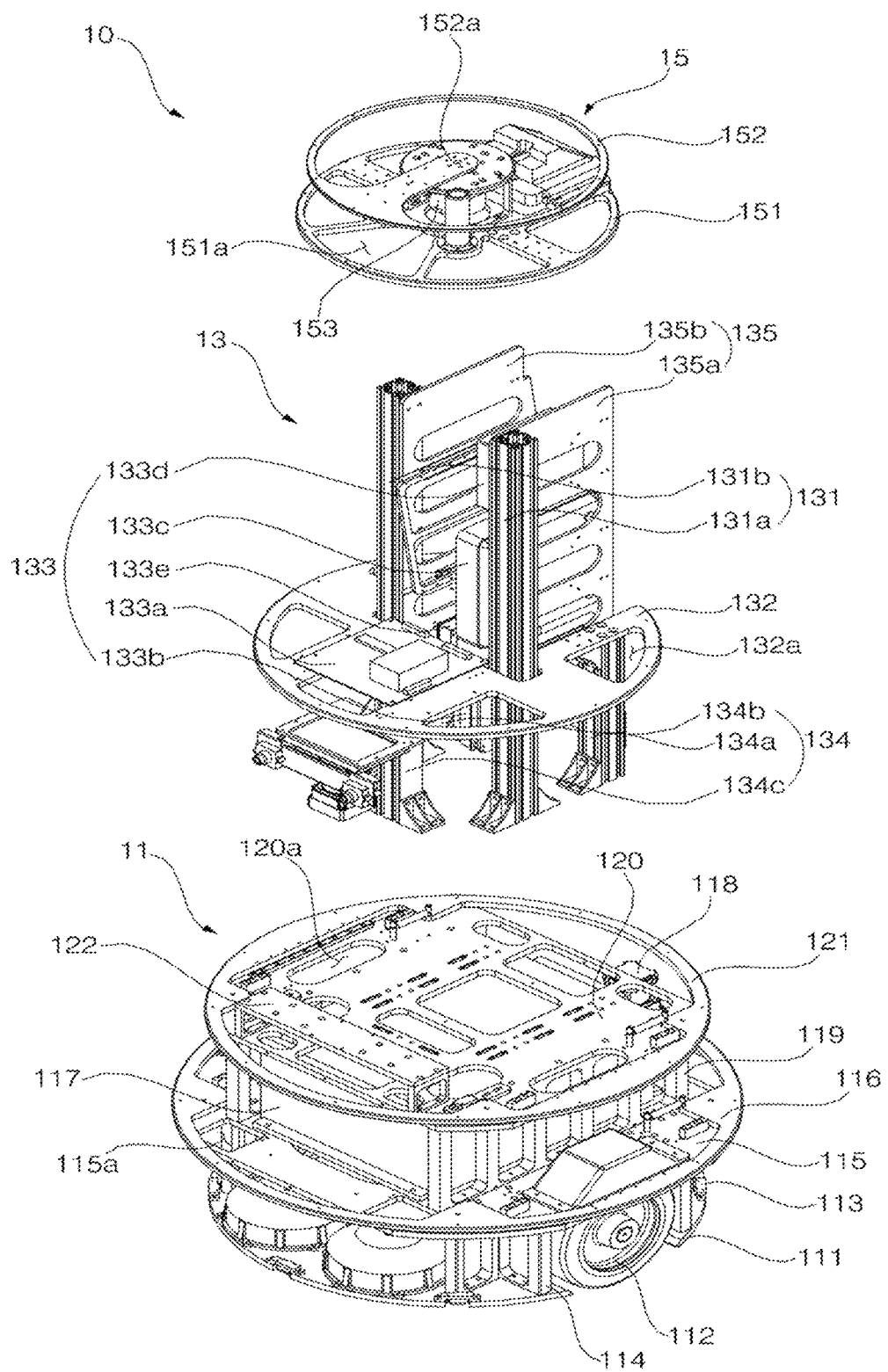
FIG. 6 is an exploded perspective view of a main body of a moving robot according to one embodiment of the present disclosure.

FIG. 6 is an exploded perspective view of the main body of the moving robot.

Referring to FIG. 6, the main body 10 according to the present disclosure may include a driving assembly 11. The driving assembly 11 may include a number of components for travel of the moving robot 1.

In detail, the driving assembly 11 may include the base 111. The base 111 may define the bottom of the moving robot 1.

The base 111 may have a disc shape, and may be positioned inside the bottom cover 34.

Further, the driving assembly 11 may further include wheels 112 for travel of the moving robot 1 and a motor (not shown) for powering the wheels 112. The wheel 112 may be rotated by power transmitted from the motor. A pair of wheels 112 may be installed. The left and right wheels may be disposed at the left and right sides of the base 111 respectively. Further, a pair of motors may be installed and may be coupled to the pair of wheels 112, respectively. However, the present disclosure is not limited thereto. A single motor may be driven to drive the pair of wheels 112.

In one example, the moving robot 1 may further include a cliff sensor 113.

The cliff sensor 113 may be configured for detecting a cliff in front of the moving robot 1 in a range of 360 degrees. The cliff sensor 113 may include multiple cliff sensors.

In one example, the plurality of cliff sensors 113 may be arranged and spaced apart from each other along an edge of the base 111.

Further, the cliff sensors 113 may be arranged along a region adjacent to the front lidar 136 and the first cut-away 331 and may face downwardly. Accordingly, when a cliff and a small child may approach the robot, the cliff sensor may detect this situation.

Further, the driving assembly 11 may further include a first support rib 114. The first support rib 114 may support a first support plate 115 to be described later. The first support rib 114 may extend upwards from a top face of the base 111. In one example, the first support rib 114 may extend upwardly from an edge of the base 111. The first support rib 114 may include a plurality of first support ribs. Each of some of the plurality of first support ribs 114 may be hollowed out or recessed to minimize a weight thereof.

In the present embodiment, two first support ribs 114 may be connected to each other in a "L" shape. However, the present disclosure is not limited thereto. The first support rib 114 may be placed at various positions and may have various shapes.

Further, the driving assembly 11 may further include the first support plate 115.

The first support plate 115 may be placed on a top of the first support rib 114. The first support plate 115 may have a plate shape. Further, the first support plate 115 may include a weight-reducing hole 115a to minimize a weight thereof. The weight-reducing holes 115a may be arranged and spaced apart from each other in the top face of the first support plate 115.

Further, the driving assembly 11 may further include a first bumper 116. When an external impact is applied to the first bumper 116, the bumper 116 may absorb a certain amount of the impact. To this end, the bumper 116 may move back and forth. The first bumper 116 may be formed in a hollow ring shape and may be placed on the top face of the first support plate 115.

Further, the driving assembly 11 may further include a battery 117.

The battery 117 may supply power for driving the moving robot 1. When considering a center of gravity of the moving robot 1, the battery 117 may be placed at a center of the top face of the first support plate 115. The battery 117 may be a component of the largest weight in the moving robot 1. Thus, the battery may be positioned at a lower level of the main body 10.

Further, the driving assembly 11 may receive the rear lidar 118.

The rear lidar (Light Detection and Ranging) 118 may be embodied as a laser radar and may be a sensor that irradiates a laser beam and collects and analyzes rearwards scattered light among light absorbed or scattered by aerosol, thereby performing position recognition of a target. The rear lidar 118 may be placed behind the first support plate 115. That is, the rear lidar 118 may face a scene in rear of the moving robot 1. Further, the rear lidar 118 may be exposed to the outside through the second cut-away 332 formed in the second middle cover 33.

Further, the driving assembly 11 may further include a second support rib 119. The second support rib 119 may support a second support plate 120 to be described later. The second support rib 119 may extend upwards from the top face of the first support plate 115.

Specifically, the second support rib 119 may be formed at an edge of the battery 117. In one example, second support ribs 119 may be formed on both sides of the battery 117, respectively. The second support rib 119 may include a plurality of second support ribs 119 to increase the supporting capacity. Tops of the plurality of second support ribs 119 may be connected to each other. That is, the second support rib 119 may have an arch shape. However, the present disclosure is not limited thereto. The second support rib 119 may be formed in various shapes.

Further, the driving assembly 11 may further include the second support plate 120. The second support plate 120 may be placed on a top of the second support rib 119. The second support plate 120 may have a plate shape. Further, the second support plate 120 may include a weight-reducing hole 120a to minimize a weight thereof. The weight-reducing holes 120a may be arranged and spaced apart from each other in the top face of the second support plate 120.

Further, the driving assembly 11 may further include a second bumper 121. The second bumper 121 has the same configuration as the first bumper 116. In order to absorb a certain amount of impact, the second bumper 121 may move back and forth. The second bumper 121 may be formed in a ring shape and may be placed on the top face of the second support plate 120.

Further, the driving assembly 11 may further include a height-adaptation rib 122. The height-adaptation rib 122 may adapt a vertical level of the front lidar 136 which will be described later to the first cut away 331. In other words, the height-adaptation rib 122 may be positioned below the front lidar 136 to match the heights of the front lidar 136 and the first cut-away 331 with each other. The height-adaptation rib 122 may extend upwards from the front top face of the second support plate 120.

In one example, the main body 10 may further include a body structure 13. The body structure 13 is disposed above the driving assembly 11. The body structure 13 may include various substrates 133 on which circuitry for controlling an overall operation of the moving robot 1 may be mounted may be disposed on. In this embodiment, the substrates 133 may include a first substrate 133a, a second substrate 133b, a third substrate 133c, a fourth substrate 133d and a fifth substrate 133e.

In detail, the body structure 13 may include a main frame 131. The main frame 131 may support the body display assembly 20 and a head structure 15 to be described later. The main frame 131 may include a first main frame 131a and a second main frame 131b. Each of the first main frame 131a and the second main frame 131b may have a pillar shape that is elongated in the vertical direction. Further, each of the first main frame 131a and the second main frame 131b may be fixed to the top face of the second support plate 120.

In one example, the first main frame 131a and the second main frame 131b may be equally spaced apart from a center of the second support plate 120. That is, the first main frame 131a and the second main frame 131b may be symmetrical with respect to the center of the second support plate 120. Further, the head structure 15 may be coupled to the top of each of the first main frame 131a and the second main frame 131a.

Further, the body structure 13 may further include a third support plate 132. The main frame 131 may pass through the third support plate 132. Thus, the main frame 131 may fit with the third support plate 132. The third support plate 132 may be positioned below a bisecting level to bisect the main frame 131 vertically. The third support plate 132 has a disk shape. In order to minimize the weight, the third support plate 132 may include a weight-reducing hole 132a.

Further, the body structure 13 may further include the first substrate 133a. The first substrate 133a may be placed on a top face of the third support plate 132. The first substrate 133a may include, for example, an AP (Application Processor) board. The AP board may function to manage an entire system of hardware modules of the moving robot 1, that is, may act as a controller 740 in FIG. 7.

Further, the body structure 13 may further include an auxiliary frame 134. The auxiliary frame 134 may be formed below the third support plate 132 to serve to support the third support plate 132. The auxiliary frame 134 may have a height smaller than a height of the main frame 13.

Specifically, the auxiliary frame 134 may include a first auxiliary frame 134a and a second auxiliary frame 134b. each of the first auxiliary frame 134a and the second auxiliary frame 134b may have a columnar shape that is elongated in the vertical direction. Further, each of the first auxiliary frame 134a and the second auxiliary frame 134b may be fixed to the top face of the second support plate 120.

Each of the first auxiliary frame 134a and the second auxiliary frame 134b may be disposed adjacent to the main frame 131. In one example, the first auxiliary frame 134a and the second auxiliary frame 134b may be equally spaced apart rearwards from the first main frame 131a and the second main frame 131b, respectively. That is, the first auxiliary frame 134a and the second auxiliary frame 134b may be symmetrical with respect to the center of the second support plate 120. Further, the third support plate 132 may be coupled to the top of each of the first auxiliary frame 134a and the second auxiliary frame 134a.

Further, the auxiliary frame 134 may further include a third auxiliary frame 134c. The third auxiliary frame 134c may have a columnar shape that is elongate in the vertical direction. Further, the third auxiliary frame 134c may be fixed to the top face of the second support plate 120 as in the first auxiliary frame 134a and the second auxiliary frame 134b.

Further, the third auxiliary frame 134c may be placed adjacent to the main frame 131. In one example, the third auxiliary frame 134c may be spaced forwards from the center of the second support plate 120 by a predefined spacing. That is, when considering the center of gravity of the third support plate 132, the third auxiliary frame 134c may be positioned in front of the main frame. Further, the third support plate 132 may be coupled to the top of the third auxiliary frame 134c.

Further, the body structure 13 may further include a bracket 135. The bracket 135 may have a plate shape and may be elongate in the vertical direction and may be coupled to the main frame 131. Specifically, the bracket 135 may include a first bracket 135a and a second bracket 135b.

The first bracket 135a may be coupled to the first main frame 131a, and the second bracket 135b may be coupled to the second main frame 131b.

The first bracket 135a and the second bracket 135b may be arranged to face away each other. That is, the first bracket 135a and the second bracket 135b may be fixed to an inner face of the first main frame 131a and to an inner first face of the second main frame 131b respectively. The inner faces of the first main frame 131a and second main frame 131b may face away each other.

Further, the first bracket 135a may extend downward from a top of the first main frame 131a while the second bracket 135b may extend downward from a top of the second main frame 131b. Further, each of a bottom of the first bracket 135a and a bottom of the second bracket 135b may penetrate the third support plate 132.

Further, the body structure 13 may further include the second substrate 133b. The second substrate 133b may be disposed on the first bracket 135a. Specifically, the second substrate 133b may be disposed on the bottom of the first bracket 135a. The second substrate 133b may include an MCU board (Micro Controller Unit board) in one example. The MCU board may control an overall operation of the moving robot 1. Further, the second substrate 133b may have a memory disposed thereon or the MCU board may include a memory storing data supporting various functions of the moving robot 1.

Further, the body structure 13 may further include the third substrate 133c. The third substrate 133c may be placed on the first bracket 135a. Specifically, the third substrate 133c may be disposed above the second substrate 133b. The third substrate 133c may include a stereo board in one example. The stereo board processes sensed-data collected from various sensors and cameras, and thus may be responsible for management of data for position recognition and obstacle recognition of the moving robot 1.

Further, the body structure 13 may further include the fourth substrate 133d. The fourth substrate 133d may be placed on the first bracket 135a. Specifically, the fourth substrate 133d may be disposed above the third substrate 133c. The fourth substrate 133d may include a user interface board in one example.

The user interface board may control an operation of a component responsible for input and output from and to the user.

Further, the body structure 13 may further include the fifth substrate 133e. The fifth board 133e may be placed on the second bracket 135b. Specifically, the fifth substrate 133e may be disposed on an inner face of the second bracket 135b and face away the second substrate 133b. The fifth substrate 133e may include a power board in one example. The power board may control power of the battery 117 to be supplied to each component included in the moving robot 1.

In the present embodiment, the body structure 13 has been described as including the five substrates 133a, 133b, 133c, 133d, and 133e. However, the number of the substrates 133 is not limited thereto and may be larger or smaller than 5. Further, types of the substrates are merely examples. The present disclosure is not limited to the types of the substrates as mentioned above.

Further, the front lidar 137 may be disposed on the body structure 13. The front lidar 137 may be embodied as a laser radar, and may be a sensor that irradiates a laser beam and collects and analyzes rearwards scattered light among light absorbed or scattered by aerosol, and thus performs position recognition. The front lidar 137 may have the same configuration as the rear lidar 118. However, the front lidar 137 may be disposed in front of the second support plate 120. That is, the front lidar 137 may face a scene in front of the moving robot 1. Further, the front lidar 137 may be exposed to the outside through the first cut-away 331 formed in the second middle cover 33. Further, the front lidar 137 may be mounted on the height-adaptation rib 122 formed on the second support plate 120.

Further, on the body structure 13, the stereo camera 137 may be disposed. The stereo camera 137 may perform a function of detecting an obstacle in front of the moving robot 1 together with the RGBD sensor 321. The stereo camera 137 may use two cameras to obtain a stereoscopic image and may measure a distance between the moving robot 1 and the obstacle based on the acquired stereoscopic image. In one example, the stereo camera 137 may be positioned rightly above the front lidar 137. To this end, the stereo camera 137 may be fixed to one side face of the third auxiliary frame 134c. Further, the stereo camera 137 may capture a scene in front of the moving robot 1 through the image capturing hole 323 formed in the first middle cover 32.

In one example, the main body 10 may further include the head structure 15. The head structure 15 may be disposed above the body structure 13. Further, the head structure 15 may be combined with the top cover 31. The head structure may be configured to allow the top cover 31 to be rotatable.

In detail, the head structure 15 may include a fourth support plate 151. The fourth support plate 151 may be placed on the top of the main frame 131, and may be combined with the main frame 131. The fourth support plate 151 has a disk shape. To minimize a weight thereof, the fourth support plate 151 may include a weight-reducing hole 151a.

Further, the head structure 15 may further include a rotating member 152. The rotating member 152 may be placed on the top of the fourth support plate 151, and may be configured to rotate by a predefined angular degree. The rotating member 152 may have a ring shape. Further, the rotating member 152 may be coupled to a rotating motor described below. To this end, the rotation member 152 may include a motor coupling portion 152a extending from an edge of the ring inwardly toward a center of the rotation member 152. Further, the top cover 31 may be coupled to an edge of the rotating member 152. Thus, the top cover 31 may be rotated together with the rotation of the rotating member 152.

Further, the head structure 15 may further include a rotary motor 153. The rotary motor 153 may provide power to rotate the rotary member 152. The rotary motor 153 has a rotation shaft. The rotation shaft may be coupled to the motor coupling portion 152a. Therefore, the rotation member 152 may be rotated in one direction or an opposite direction using a rotating force of the rotation motor 153. The rotary motor 153 may include, for example, a DC motor, but is not limited thereto. Various motors such as a stepping motor may be applied thereto.

FIG. 7 is a block diagram showing a control relationship between the main components of the moving robot according to one embodiment of the present disclosure.

Referring to FIG. 7, the moving robot 1 according to one embodiment of the present disclosure may include a voice interface 725 to receive the user's voice input through the microphone 314, a storage 730 for storing various data therein, a communicator 790 that sends and receives data to and from other electronic devices such as servers (not shown), and a controller 740 that controls an overall operation of the moving robot 1. The components may be mounted on the substrate 133 as described above.

The voice interface 725 may include or may be connected to a processing unit that converts analog sound into digital data, thereby to convert the voice signal from the user to data adapted to the controller 740 or the server (not shown).

The controller 740 may control the voice interface 725, the storage 730, and the communicator 790 which constitute the moving robot 1, thereby controlling the overall operation of the moving robot 1.

The storage 730 may record therein various information required for controlling the moving robot 1, and may include a volatile or nonvolatile recording medium. The recording medium may store therein data that may be read by a microprocessor and may include SSD (Solid State Disk), SDD (Silicon Disk Drive), ROM, RAM, CD-ROM, a magnetic tape, a floppy disk, an optical data storage device and the like.

Further, the storage 730 may store therein various data necessary for the moving robot 1 to provide a guide service.

Further, the controller 740 may transmit an operation state or user input of the moving robot 1 to the server via the communicator 790.

The communicator 790 may include at least one communication module so that the moving robot 1 may be connected to the Internet or a predefined network.

In one example, the storage 730 may store therein data for voice recognition. The controller 740 may process the voice signal of the user input through the voice interface 725 and perform a voice recognition process thereof.

In one example, the controller 740 may control the moving robot 1 to perform a predefined operation based on the voice recognition result.

For example, when a command included in the voice signal is a command for requesting predefined information such as flight departure information and tour guide information, the controller 740 may control the display 710 to display the predefined information such as the flight departure information and tour guide information.

Further, when the user requests a guide to a destination, the controller 740 may control the robot 1 to escort the user to the guide destination.

In one example, the voice recognition process may be performed on the server instead of the moving robot 1 itself.

In this case, the controller 740 may control the communicator 790 such that the user input voice signal is sent to the server. The controller 740 may receive a recognition result about the voice signal from the server via the communicator 790.

Alternatively, simple voice recognition such as call word recognition may be performed by the moving robot 1, while high-level voice recognition such as natural language processing may be performed by the server.

In one example, the moving robot 1 may include the display 710 for displaying predefined information visually and a sound output interface 780 for outputting predefined information in an audio manner.

The display 710 may visually display information corresponding to a request input from the user, a processing result corresponding to the request input from the user, an operation mode, an operation state, an error state, and the like.

As described above with reference to FIG. 1 to FIG. 6, the display 710 may include the head display 312 and the body display 21. The body display 21 may be relatively larger in size than the head display 312. Information may be displayed on the body display 21 using a large screen.

Further, the sound output interface 780 may output a sound indicating an alarm, a notification message such as an operation mode, an operation status, and an error status, information corresponding to the user's request input, and a processing result corresponding to the user's request input under control of the controller 740. The sound output interface 780 may convert an electrical signal from the controller 740 into an audio signal and output the same. To this end, the sound output interface 780 may include a speaker or the like.

In one example, the moving robot 1 may include an image acquisition unit 720 that may capture a scene in a predefined range.

The image acquisition unit 720 may capture surroundings around the moving robot 1 and an external environment thereto, and may include a camera module. The image acquisition unit 720 may include multiple cameras installed on various locations respectively for improving the imaging efficiency.

For example, as described above referring to FIG. 1 to FIG. 6, the image acquisition unit 720 may include the head camera 313 for human and object recognition and the body camera 25 for identification and tracking of a guide target. However, the number, arrangement, type, and imaging range of the cameras included in the image acquisition unit 720 may not be necessarily limited thereto.

The image acquisition unit 720 may capture an image for user recognition. The controller 740 may determine an external situation or recognize a user as the guide target based on the image captured by the image acquisition unit 720.

Further, the controller 740 may control the moving robot 1 to travel based on the image taken by the image acquisition unit 720.

In one example, the image taken and obtained by the image acquisition unit 720 may be stored in the storage 730.

In one example, the moving robot 1 may include a driving assembly 760 for moving the robot. The driving assembly 760 may correspond to the driving assembly 11 described above with referring to FIGS. 1 to 6.

Further, the moving robot 1 may include a sensor unit 770 including sensors for sensing various data related to an operation and status of the moving robot 1.

The sensor unit 770 may include an obstacle detection sensor for detecting an obstacle. The obstacle detection sensor may include an infrared sensor, an ultrasonic sensor, an RF sensor, a geomagnetic sensor, a PSD (Position Sensitive Device) sensor, and the like. For example. The obstacle detecting sensor may include the ultrasonic sensor 333, and the RGBD sensor 321 as described above with referring to FIG. 1 to FIG. 6.

Further, the sensor unit 770 may further include the cliff sensor 113 for detecting presence or absence of a cliff on a floor in a travel zone.

Further, the sensor unit 770 may include the lidars (light detection and ranging) 136 and 118.

The lidars 136 and 118 may detect an object such as an obstacle based on a TOF (Time of Flight) of a transmission signal and a reception signal or a phase difference between the transmission signal and the reception signal via a laser beam.

Further, the lidars 136 and 118 may detect a distance to the object, a relative velocity with respect to the object, and a position of the object.

Each of the lidars 136 and 118 may be embodied as a component of the obstacle detecting sensor. Further, the lidars 136 and 118 may be embodied as a sensor for creating a map.

In one example, the obstacle detection sensor may detect an object, especially, an obstacle that exists in the travel direction of the moving robot, and thus may pass the obstacle information to the controller 740. In this connection, the controller 740 may control movement of the moving robot 1 based on the detected position of the obstacle.

In one example, the sensor unit 770 may further include a motion detection sensor that detects a motion of the moving robot 1 according to the driving of the main body 101 and outputs motion information. For example, the motion detection sensor may include a gyro sensor, a wheel sensor, and an acceleration sensor.

The gyro sensor detects a rotation direction and detects a rotation angle when the moving robot 1 moves based on an operation mode. The gyro sensor detects an angular velocity of the moving robot 1 and outputs a voltage value proportional to the angular velocity. The controller 740 uses the voltage value output from the gyro sensor to calculate the rotation direction and the rotation angle.

The wheel sensor is connected to each of a left wheel and a right wheel to sense the number of revolutions of each wheel. In this connection, the wheel sensor may be a rotary encoder. The rotary encoder senses the number of revolutions of each of the left and right wheels and outputs the sensed result.

The controller 740 may use the number of revolutions to calculate the rotational velocity of each of the left and right wheels. Further, the controller 740 may use a difference between the rotational velocities of the left wheel and the right wheel to calculate the rotation angle.

The acceleration sensor detects a change in the velocity of the moving robot 1, for example, a velocity change in the moving robot 1 due to start, stop, direction change, collision with an object, and the like. The acceleration sensor may be attached to an adjacent position to a main wheel or auxiliary wheel to detect slippage or an idle state of the wheel.

Further, the acceleration sensor may be built into the controller 740 and may detect the velocity changes of the moving robot 1. That is, the acceleration sensor detects the impact amount according to the velocity change and thus outputs a voltage value corresponding thereto. Thus, the acceleration sensor may perform a function of an electronic bumper.

The controller 740 may calculate a position change of the moving robot 1 based on the motion information output from the motion detection sensor. This position may be a relative position to an absolute position using image information The moving robot may improve performance of position recognition using image information and obstacle information based on the relative position recognition.

FIG. 8 is a flowchart illustrating a method of operating a moving robot according to one embodiment of the present disclosure.

Referring to FIG. 8, the moving robot 1 according to one embodiment of the present disclosure may configure a grid map to have a plurality of nodes S810.

The configuration of the map may include downloading of a file or a grid map on which a guide destination, a waypoint, an intersection, and other nodes are arranged from a service provider or a manufacturer of the robot. The configuration of the map may include receiving a node setting input from the user while the grid map is displayed on the head display 312 or body display 21.

The controller 740 may set plurality of nodes such as guide destinations, waypoints, intersections, other nodes, etc. on the grid map based on the received file or input.

According to an embodiment, the moving robot 1 may recognize a space and an object based on learned data and, then, based on the recognition of the space and object learned during multiple travels, may set key points as nodes.

The plurality of nodes may include a destination node corresponding to a preset guide destination and a general node for forming a route to the guide destination. For example, in an airport, a destination to which the user may request a guide, such as a boarding gate, a duty free shop, and a toilet may be set as the destination node. A node included in a guide route to the destination node may be set as the general node.

In one example, the destination node and the general node may be displayed to have different presentation features including at least one of a color, size, or shape.

For example, a node may be represented as a point with a specific color R, G, or B on an image. In this case, the destination node may be marked in red, while the general node may be marked in green. Accordingly, an administrator may easily distinguish between the destination node and the general node among current nodes and efficiently manage the nodes.

In one example, the grid map may be a SLAM (simultaneous localization and mapping) map, or a CAD map.

In one example, the grid map may be saved in an image file format. In large public areas such as airports and terminals, a loading time of the grip map may be long due to a large file size of the grid map. Thus, calculation of the guide route takes a considerable amount of time. Thus, the user may feel uncomfortable because the robot may not respond quickly to the user's guide request.

Thus, a method in accordance with the present disclosure may create a topological map based on grid map information modeling a large-area environment, and then may use the map to create a guide route, thereby to quickly create the guide route to the guide destination and to improve a guide service provision speed and a robot travel performance.

To this end, the moving robot 1 may extract coordinates of the plurality of nodes identified in the grid map S820, and may extract adjacent nodes which are spaced from each other by a distance smaller than or equal to a predefined distance and create (register) an edge between the adjacent nodes S830. This operation S830 may be repeated to connect all nodes to each other to create a topological map S840. This creation of the topological map may be performed by the controller 790.

The topological map may be created by setting a feature point as a node, and connecting nodes with other using a branch. This approach may similar to a way by which a person finds a way to a destination. The edge may mean the branch connected between the nodes.

In the topological map, a relative positional order between nodes is important. Thus, the topological map may be composed only of coordinates of nodes and correlations between the nodes. The topological map covering a large area may be created using small data capacity.

Further, the topological map may be created and stored in a form of a text representing the coordinates of the nodes and the correlations between the nodes.

The controller 740 may load a large area grid map on a memory and extract the node coordinates. Then, among all the extracted nodes, the controller may extract a set of adjacent nodes which are spaced from each other by a distance smaller than or equal to a predefined distance (e.g., 10 m).

Then, the controller may create (register) an edge between nodes in the set and may repeat creation of an edge between other nodes in the set so that all nodes are connected to each other using edges, thereby to create the topological map.

Further, the controller 740 may store the created topological map in the storage 730.

In one example, the controller 740 may determine presence or absence of an obstacle between nodes and may create an edge between the nodes when it is determined that no obstacle is present between the nodes.

When there is present an obstacle between the nodes, the moving robot 1 should not travel along the edge connected between the nodes.

Therefore, the controller 740 may create an edge connecting two nodes with each other when there is no obstacle therebetween.

For example, the controller 740 may consider a stationary obstacle included in the grid map, and thus determine presence or absence of an obstacle between nodes based on the stationary obstacle. Further, the controller 740 may determine presence or absence of an obstacle between nodes using a ray tracing scheme.

In one example, after the creation of the topological map S840, the controller 740 may divide the grid map into divided maps, each having a predefined size S850.

Further, in some embodiments, the controller 740 may divide the topological map into divided maps, each having a predefined size S850. The topological map may be used without segmentation or division due to a small data size thereof. However, when dividing the topological map and the grid map into divided maps thereof having the same size and region and mapping the divided maps thereof with each other and managing the mapping of the divided maps thereof, the controller may quickly determine and load a required divided among the divided maps of the grid map.

In one example, the controller 740 may store the divided maps of each of the grid map and the topological map in the storage 730.

The controller 740 may create the topological map based on the CAD/SLAM map and may divide the created map into unit cells, each unit cell having a predefined size.

FIG. 8 shows a process to the creation stage of the divided maps. The creation of the divided maps may be performed once by default when executing an initial setting.

Further, when a change in a space in which the moving robot 1 is placed occurs, the divided maps may be created.

The controller 740 may then use divided maps corresponding to unit cells respectively to create a real time travel route.

For example, the controller 740 may load on a memory only a divided map containing the moving robot 1 and a target node corresponding to the guide destination and may create a real-time route based on the loaded divided map.

This may shorten a guide route creation time to a destination when using a large area map.

Further, the controller may create and change a guide route to a destination in a large space in real time while the robot travels.

FIG. 9A is a flow chart illustrating a method of operating a moving robot according to one embodiment of the present disclosure. This figure illustrates a process of creating a guide route when a user inputs a destination and then guiding the user to the destination.

Referring to FIG. 9A, the moving robot 1 may receive a guide destination input based on a voice command into the voice interface 725 or a touch input on the display 710 S910 and determine a global route to the received guide destination S920.

For example, the moving robot 1 does not load a large capacity grid map thereon. Rather, the robot 1 may determine the global route to the received guide destination based on the topological map generated previously by the process as described above with reference to FIG. 7 S920.

The controller 740 may load the entire low-volume topological map onto the memory of the storage 730. In this way, the controller 740 may create the global route at a faster speed than when loading a large volume grid map on the memory.

In one example, the global route may be composed of the destination node corresponding to the guide destination and a plurality of general nodes existing between the destination node and a current position of the moving robot 1. In one example, the topological map contains a plurality of destination nodes. However, when the user inputs a single destination, all nodes other than the input destination may be considered as general loads before guide destination change or until the end of the guide.

In one example, the controller 740 may create a left travel guideline or a right travel guideline on a left or right side around the created global route S930.

In one example, as used herein, the global route may mean a plurality of nodes set between a current position of the moving robot 1 and the guide destination, and a connection relationship between the plurality of nodes. The local route may mean a route from one of the plurality of nodes constituting the global route to a predefined node.

The controller 740 may create the local route to one of the plurality of nodes constituting the global route S950.

Further, controller 740 may respectively create a left travel guideline and a right travel guideline on left and right sides around the created global route S930. In this case, the controller 740 may create the local route within a travelable range between the left travel guideline and the right travel guideline S950.

According to the present disclosure, That is, a travel guideline may be created on at least one of the left side and the right side around the created global route. That is, at least one travel guideline may be created on the left and right sides around the global route.

Hereinafter, the present disclosure will be described based on an embodiment of creating travel guidelines on both the left and right sides around the global route. However, the present disclosure is not limited thereto.

For example, the controller may create only the left travel guideline on the left side around the global route or the right travel guideline on the right side around the global route.

Alternatively, in a specific section, a left travel guideline or right travel guideline may be created, while in another section, both the left travel guideline and right travel guideline may be created.

The left travel guideline and the right travel guideline may act as left and right travel limit lines when the moving robot 1 travels, respectively. A region from the left travel guideline to the right travel guideline may be set to a travelable range of the moving robot 1.

Accordingly, the moving robot 1 according to one embodiment of the present disclosure may travel so as not to depart from the left travel guideline and the right travel guideline.

In one example, a width of the travelable range may be determined based on a size of the moving robot and a size of a preset moving obstacle.

The preset moving obstacle may be preferably identified as an object which are most outstandingly recognized in a public place and which the robot should not collide with. Further, in a space crowded with large vehicles and carts, the large vehicles and carts may be identified as representative moving obstacles.

In one example, a distance between the left travel guideline or the right travel guideline and the global route may be preferably greater than a sum of the size of the moving robot and the size of the preset moving obstacle.

For example, the size of the moving robot 1 may be about 1 m. In this connection, the distance between the left travel guideline or the right travel guideline and the global route may be greater than the sum of the size of moving obstacle (e.g., a width of a single person) and the size of the moving robot.

In one example, the width of the travelable range may vary based on a situation at a current position of the moving robot 1 and/or characteristics of the public place where the moving robot 1 is placed.

The width of the travelable range may be not set to be uniform in an entirety of the global route but to vary in a portion thereof.

For example, the width of the travelable range may vary in each section included in the global route based on the number of moving obstacles as detected.

Further, when an obstacle detection count between a first pair of two nodes may be greater than a reference obstacle detection count, a width of the travelable range between the first pair of two nodes may be greater than a width of the travelable range between a second pair of two nodes when an obstacle detection count between the second pair of two nodes may be smaller than the reference obstacle detection count.

For a region with a high human density, the controller may enlarge the width of the travelable range to avoid collision so that the moving robot 1 may travel within the enlarged range while avoiding persons.

Further, the controller may adjust the width of the travelable range depending on an attribute of a region.

For example, for a region with a limited travel space, such as a place where a boarding ticket is issued, the controller may adjust the width of the travelable range to be smaller. For a hall at an entrance of an airport or terminal, the controller may adjust the width of the travelable range to be larger.

On the contrary, when there is a high possibility that a large number of people exist in the place where the ticket is issued, the controller may adjust the width of the travelable range to be larger such that the moving robot 1 may travel within the enlarged range while avoiding persons.

In one example, the controller 740 may set virtual data based on the left travel guideline and the right travel guideline S940. Further, the controller 740 may store the set virtual data in the memory of the storage 730.

For example, the controller 740 may set a region corresponding to each of the left travel guideline and the right travel guideline to be a virtual wall.

The moving robot 1 may recognize the virtual wall as a real wall. Thus, the virtual wall may act as a border or forbidden region through which the moving robot 1 should not travel although the robot may pass through the virtual wall.

The moving robot 1 may consider the left travel guideline and the right travel guideline as virtual obstacles, and thus consider the left travel guideline and the right travel guideline to have actual sensed data detected by the sensor unit 770.

According to the present disclosure, the controller may use the created global route to the guide destination to create the virtual travel guideline, and may control the moving robot 1 to follow the created global route to the destination without leaving the created travel guideline.

Therefore, in an environment of a public place where there are many moving obstacles, the travel guideline may appropriately limit frequent travel direction changes of the moving robot, thereby maintaining travelling of the robot in a straight manner to a maximum level.

Accordingly, a travel trajectory of a guide requester (person) following the moving robot may be more natural and comfortable to the person, thereby improving user convenience.

Further, in order to avoid obstacles, the controller may inhibit travelling away from the destination and travelling to a non-travelable region.

In one example, the sensor unit 770 may detect an obstacles and may send the detection result to the controller 740.

The controller 740 may calculate a travel velocity of the robot 1 to avoid the detected obstacle, based on the sensed data from the sensor unit 770 S970.

For example, the controller 740 may determine the travel velocity of the moving robot 1, based on a distance between the moving robot 1 and the obstacle and, based on a moving obstacle's velocity when the detected obstacle are the moving obstacle.

Further, the controller 740 may control the robot 1 to travel based on the created local route and the calculated travel velocity.

In one example, the controller 740 may consider a stationary obstacle in the global route creation, and may consider a moving obstacle in the local route creation. Thus, the controller may create a route to avoid both the stationary and moving obstacles.

In one example, the controller 740 may entirely re-create a global route based on predefined criteria S960.

For example, a moving obstacle detection count within a reference time duration may be used as the global route recreation criterion.

In this case, when the controller 740 detects that the number of moving obstacle detections within a preset reference time duration is greater than or equal to a global route recreation reference value, the controller 740 may entirely recreate a global route.

Further, the controller may compare the created local route with the travel guideline. When the created local route is out of the travelable range, and thus the controller may not create a local route within the travelable range, the controller may recreate a global route.

In one example, when recreating the global route, the controller may pause the travel of the moving robot 1.

In one example, the controller 740 may calculate a travel velocity to avoid an obstacle, based on the moving obstacle velocity detected by the sensor unit 770 and a current velocity of the moving robot 1 during the travel of the robot.

For example, the velocity and route to avoid the obstacle may be set such that the robot may avoid the obstacle when the robot will encounter the obstacle within 4.5 seconds based on the current velocity of the moving robot.

Further, the controller 740 may control the robot to travel while avoiding the obstacle within the travelable range based on the calculated avoiding velocity.

That is, the travelling while avoiding the obstacle after the creation of the local route may be performed within the travelable range.

In one example, the controller 740 may extract a next target node to which the moving robot 1 will move, among the plurality of nodes constituting the global route. The controller 740 may extract a divided map corresponding to a route to the next target node constituting the global route from the divided maps of the grid map and load the extracted divided map, and then may create a local route to the next target node based on the loaded divided map S950.

In this case, controller 740 may control the moving robot 1 to travel to the next target node based on the created local route to the next target node S980.

In one example, the controller 740 may determine whether the robot reaches the destination, after the travel S980 of the moving robot 1 S990.

When the controller 740 determine that a current position of the robot is not the destination node, the controller may increase a sequence number of a next target node by one to update the next target node.

Further, the controller 740 may create a local route to the next target node based on the loaded divided map S950. The controller may control the robot 1 to travel to the next target node based on the local route S980.

That is, the controller 740 may repeat the above process until the robot 1 reaches the destination node.

According to the present disclosure, the controller may extract and load a divided map containing a current position of the moving robot and a target node from the divided grid maps, and may create a local route to a target point in the loaded divided map.

Thus, creating the local route of the moving robot using the small volume divided map may improve the route creation speed, the real-time route creation, and the robot travel performance.

Further, loading only a small necessary portion of a large area map into the memory may save a memory space, thereby allowing efficient use of the system resource.

Next, a process of loading a divided map and creating a local route in the divided map will be described.

Figure 9B:
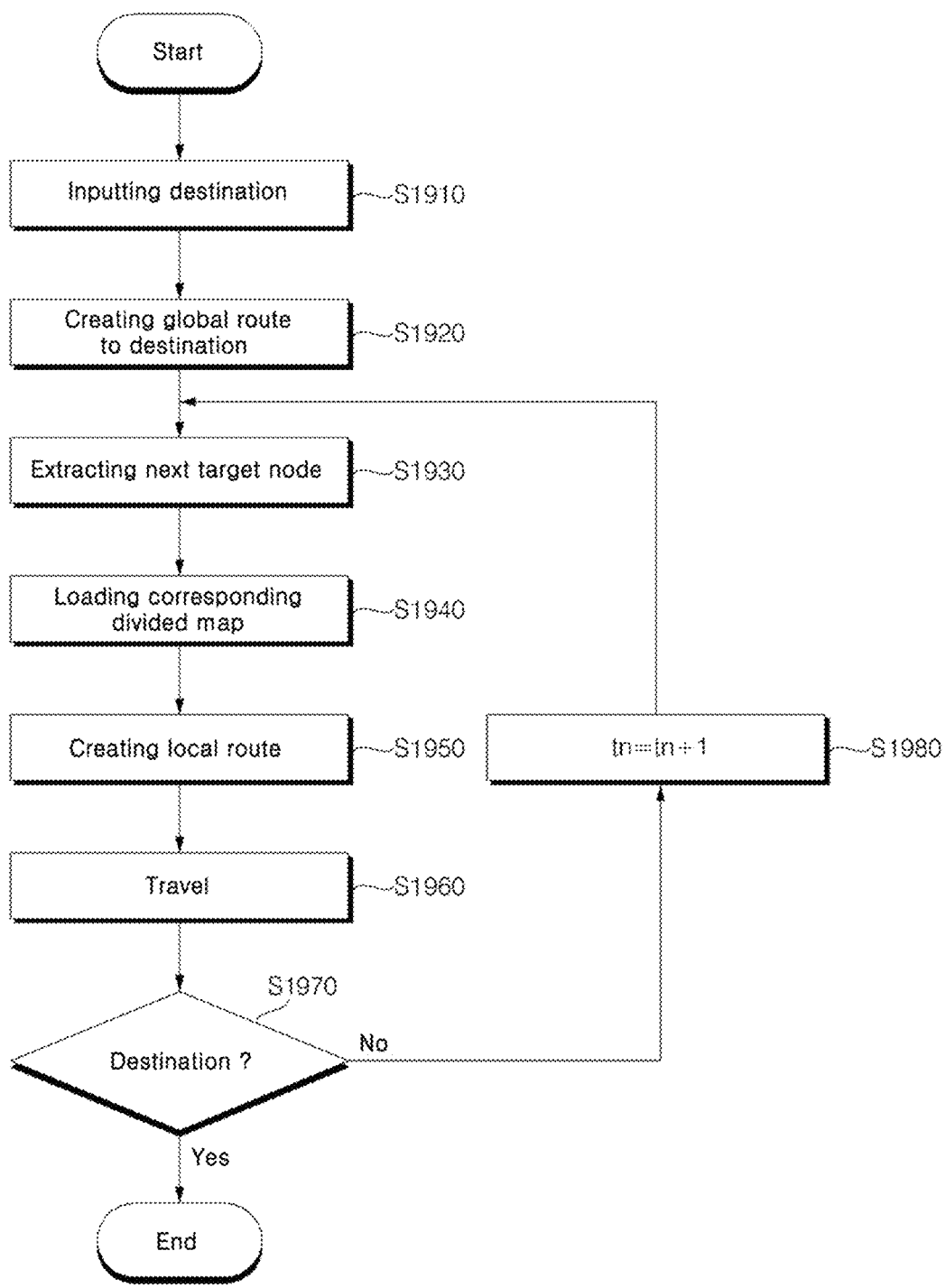

FIG. 9B is a flowchart illustrating a method of operating a moving robot according to one embodiment of the present disclosure. A process of creating a guide route upon inputting a destination and guiding the guide target to the destination is shown in FIG. 9B.

Referring to FIG. 9B, the moving robot 1 may receive a guide destination input based on a voice command from the voice interface 725 or based on a touch input on the display 710 S1910.

According to one embodiment of the present disclosure, the moving robot 1 does not load a large volume grid map. Rather, the robot 1 may determine a global route to the received guide destination based on a created topological map S1920.

The controller 740 may load the entire small volume topological map into the memory of storage 730 and thus may create the global route at a faster velocity than when loading a large volume grid map.

In one example, the global route may be composed of a destination node corresponding to the guide destination, and a plurality of general nodes existing between the destination node corresponding to the guide destination and a current position of the moving robot 1. In one example, the topological map contains a plurality of destination nodes. However, when the user inputs a single destination, all nodes other than the input destination may be considered as general loads before guide destination change or until the end of the guide.

In one example, the controller 740 may extract a next target node to which the moving robot 1 will move, from among the plurality of nodes constituting the global route S1930.

Further, the controller 740 may extract and load a divided map corresponding to a route from the current position of the moving robot 1 to the extracted next target node from among the divided maps of the grid map S1940.

For example, after inputting the destination, for a first travel, the controller 740 may extract and load a divided map corresponding to a route from the current position of the moving robot 1 to a first target node corresponding to a first sequence included in the global route, from among the divided maps of the grid map S1940.

In this connection, the first target node may refer to a next target node to which the robot 1 will move from the current position of the moving robot, among the plurality of nodes constituting the global route.

In this case, the controller 740 may create a local route to the first target node based on the loaded divided map S1950.

In one example, as used herein, the global route may mean a plurality of nodes set between a current position of the moving robot 1 and the guide destination, and a connection relationship between the plurality of nodes. The local route may mean a route from one of the plurality of nodes constituting the global route to a predefined node.

In one example, the controller 740 may control the moving robot 1 to travel to the first target node based on the local route S1960.

In one example, the controller 740 may determine whether the robot 1 reaches the destination, after the travel S1960 of the moving robot 1 S1970.

When the controller 740 determine that a current position of the robot is not the destination node S1970, the controller may increase a sequence number of a next target node by one to update the next target node S1980. The controller may extract the updated next target node S1930, and may extract and load a divided map corresponding to the extracted updated next target node S1940.

Further, the controller 740 may create a local route to the next target node based on the loaded divided map S1950. The controller may control the robot 1 to travel to the next target node based on the created local route S1960.

For example, because the first target node is not the destination node, the controller 740 may extract and load a divided map corresponding to a route from the current position of the moving robot 1 to a second target node as a next node constituting the global route, from among the divided maps of the grid map S1940.

Further, the controller 740 may create a second local route to the second target node based on the loaded divided map S1950. The controller may control the robot 1 to travel to the second target node based on the second local route S1960.

That is, the controller 740 may repeat the above process until the robot 1 reaches the destination.

According to the present disclosure, the controller may extract and load a divided map containing a current position of the moving robot and a target node from the divided grid maps, and may create a local route to a target point in the loaded divided map.

Thus, creating the local route of the moving robot using the small volume divided map may improve the route creation speed, the real-time route creation, and the robot travel performance.

Further, loading only a small necessary portion of a large area map into the memory may save a memory space, thereby allowing efficient use of the system resource.

In some embodiments, the divided maps may not be sequentially loaded according to the target nodes. Rather, the controller may load a plurality of divided maps included in the global route among the divided maps of the grid map.

That is, the controller 740 may use the topological map to create the global route and then may load the nodes constituting the global route at one time.

When the controller loads the nodes constituting the global route at one time, required data volume is larger than that when loading the divided maps sequentially. However, in the former case, the data volume is smaller than that when loading the entire grid map. Thus, a processing rate may be further improved.

In this case, the controller 740 may create a local route to the next target node based on the loaded divided maps and may control the moving robot 1 to travel to the next target node based on the created local route.

Further, after moving, when the controller 740 determines that a current position of the robot is not the destination node, the controller updates the next target node. The controller 740 may create a local route to the updated next target node based on the loaded divided maps and may control the moving robot 1 to travel to the next target node based on the created local route.

Figure 10:
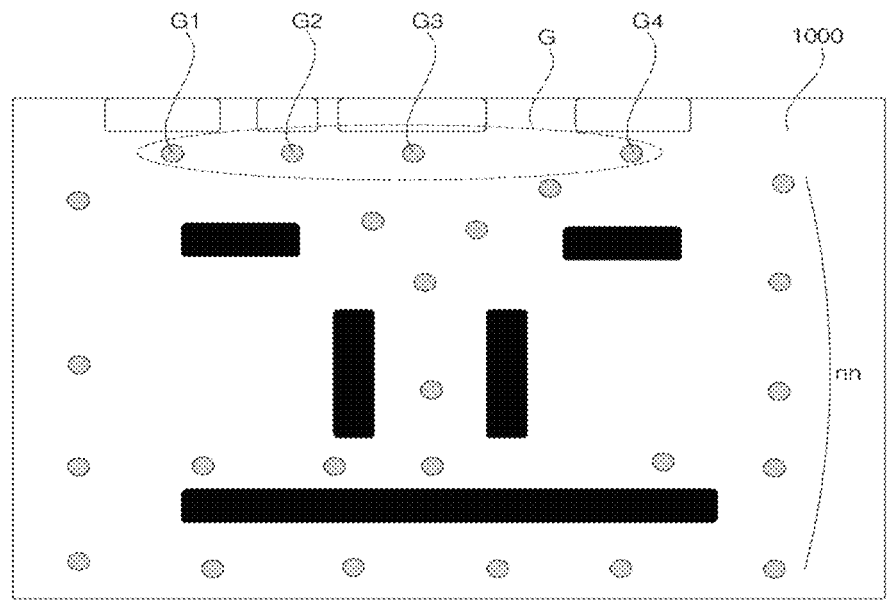
FIG. 10 to FIG. 27 illustrate drawings supporting a description of a method of operating a moving robot according to an embodiment of the present disclosure.

FIG. 10 illustrates a plurality of nodes G and nn as set in a grid map 1000 created in a CAD/SLAM manner.

Referring to FIG. 10, the plurality of nodes G and nn may include a destination node G corresponding to a preset guide destination and a general node nn for forming a route to the guide destination.

The destination node G and the general node nn may be displayed to be distinguished from each other by varying at least one of a color, size, and shape thereof.

For example, a node may be represented as a point with a specific color R, G, or B on an image. In this case, the destination node G may be displayed in red. The general node nn may be displayed in green.

In one example, in the guide mode, one G4 of the destination nodes G may be selected as a guide target destination. In this case, each of destination nodes G1, G2, and G3 other than the G4 may be considered as a general node depending on the creased global route.

According to the present disclosure, the controller may use a large area grid map to create a topological map.

Figure 11:
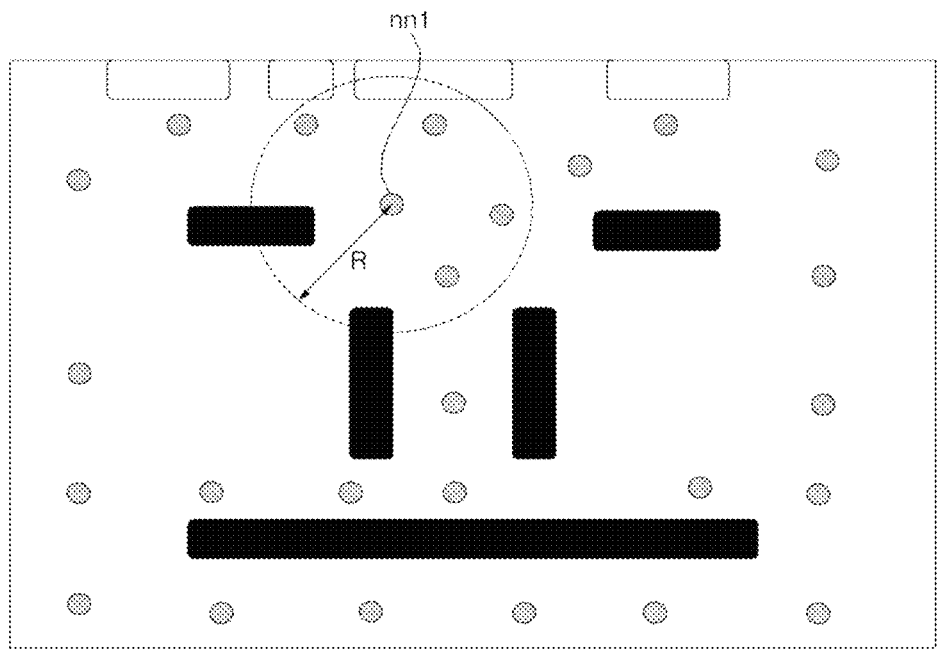

Referring to FIG. 11, after loading the large area grid map, the controller may extract node coordinates. Then, among all the extracted nodes, the controller may extract a set of adjacent nodes which are spaced from each other by a distance smaller than or equal to a predefined distance R.

Further, the controller 740 determines presence or absence of an obstacle between the nodes. The controller may create an edge or branch between the nodes when it is determined that no obstacle is present therebetween.

For example, the controller 740 may determine the presence or absence of the obstacle between nodes based on a stationary obstacle included in the grid map.

Further, the controller 740 may determine the presence or absence of an obstacle between the nodes using a ray tracing scheme.

Figure 12A:
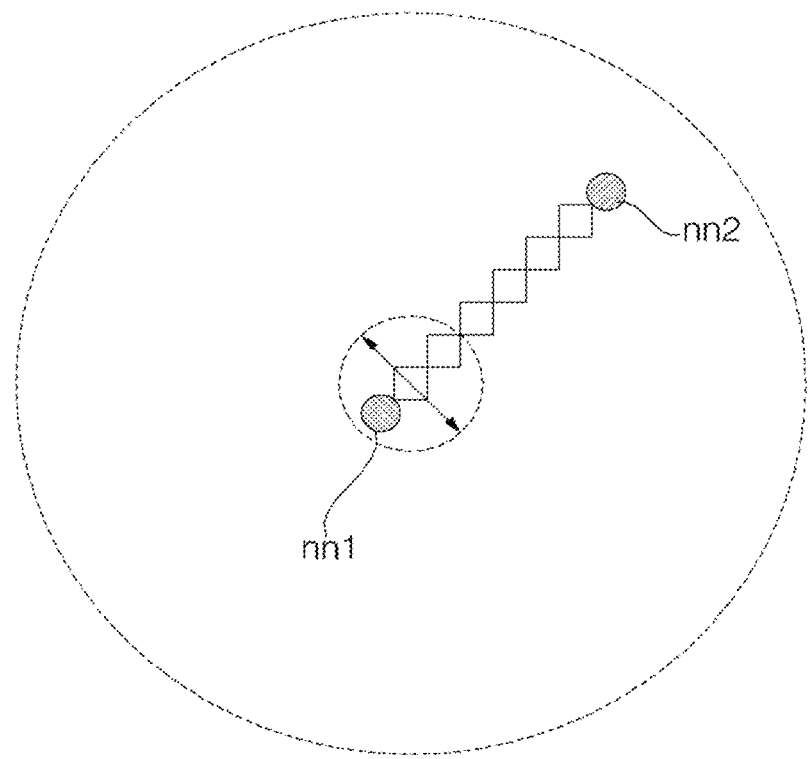
Figure 12B:
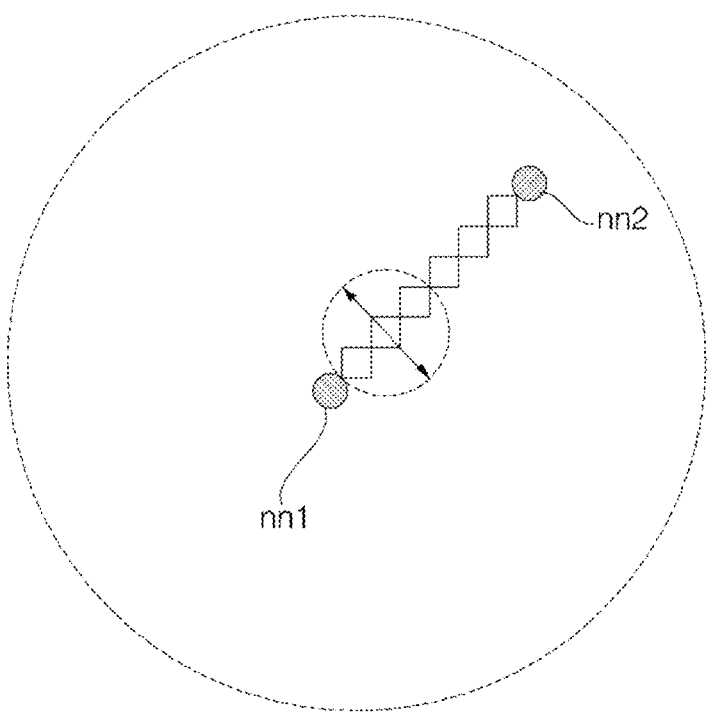
Figure 12C:
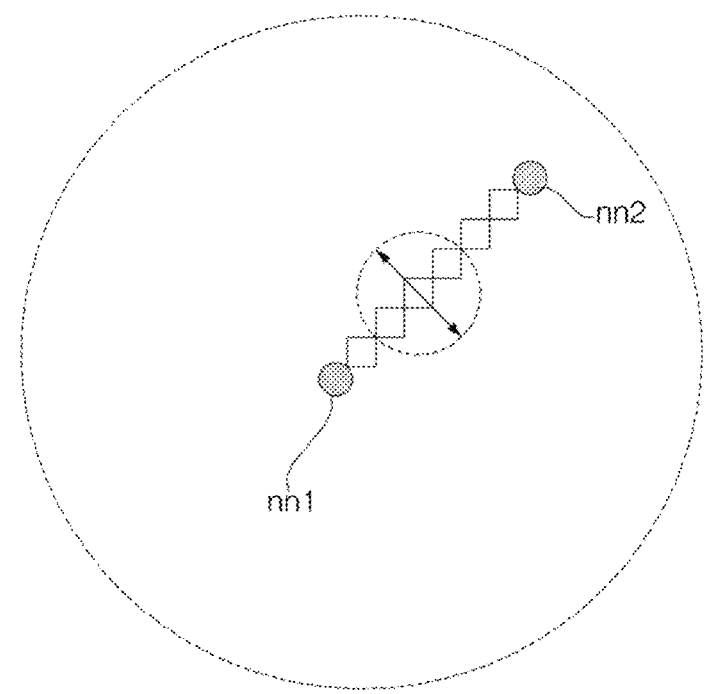

Referring to FIG. 12A to FIG. 12C, ray tracing from a first node nn1 to a second node nn2 may be executed. Based on the ray tracing result, the controller may the presence or absence of an obstacle between the nodes within a predefined range.

For example, this scheme may define a straight line route from the first node nn1 to the second node nn2 as a ray. The controller may change coordinates sequentially within the ray and then analyze obstacle information of the grid map in the changed coordinates.

Referring to FIG. 12A, the controller may increment a distance value by a predefined unit value in a virtual ray set in a direction from the first node nn1 to the second node nn2.

After calculating a coordinate of a point away from the first node nn1 by the incremented unit value toward the second node nn2, the controller may identify obstacle information in the grid map and then determine whether there is present a stationary obstacle at the calculated corresponding coordinate.

The controller may extract coordinates of points included in the ray and identify obstacle information in the grid map, and thus determine whether there is present a stationary obstacle in the extracted corresponding coordinates.

Alternatively, when only coordinate information of the first node nn1 and the second node nn2 may be identified, and coordinates of predefined points contained in the imaginary ray set in the direction to the second node nn2 from the first node nn1 may not be directly identified, the controller may use angle information and distance value of the imaginary ray set in the direction to the second node nn2 from the first node nn1 to calculate X and Y coordinates of the predefined points using sine and cosine values.

Then, as shown in FIG. 12*b* and FIG. 12*c*, while increasing the distance value by a predefined unit value sequentially, the controller may calculate X and Y coordinates corresponding to a point having the increased distance value, and then may determine whether there is present a stationary obstacle at the corresponding calculated coordinate in the grid map.

The controller 740 may register an edge between the second node nn2 and the first node nn1 when the ray reaches the second node nn2 without collision with the obstacle.

When checking the presence or absence of the obstacle to the second node nn2 while increasing the distance value in the ray, the obstacle may be detected. In this case, the controller may not create the edge between the first node nn1 and the second node nn2.

Figure 13:
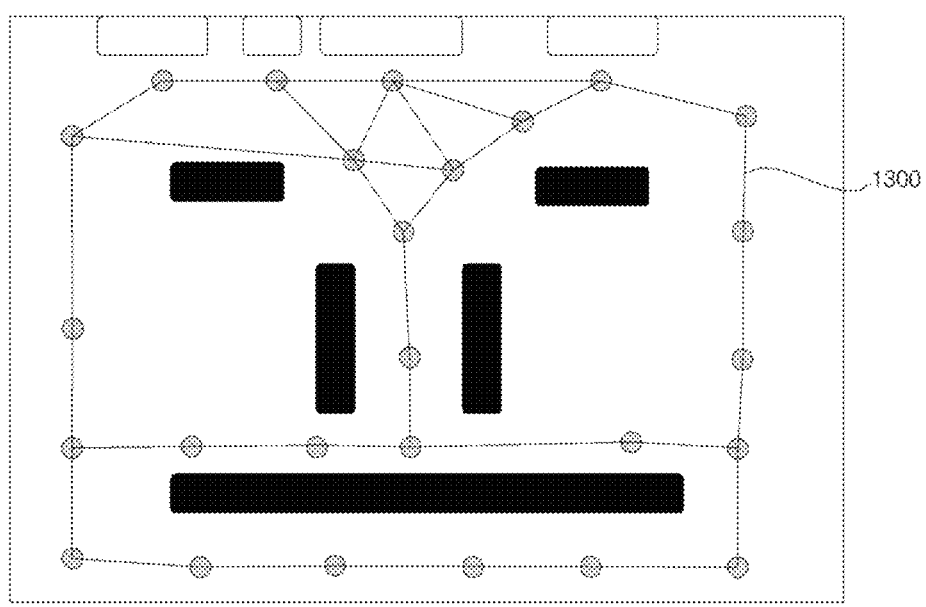

FIG. 13 shows an example of a created topological map 1300.

The controller 740 may create a topological map 1300 by repeating a process of extracting two nodes which are spaced from each other by a distance within a predefined range, and creating an edge between the nodes to connecting all nodes to each other.

Figure 14:
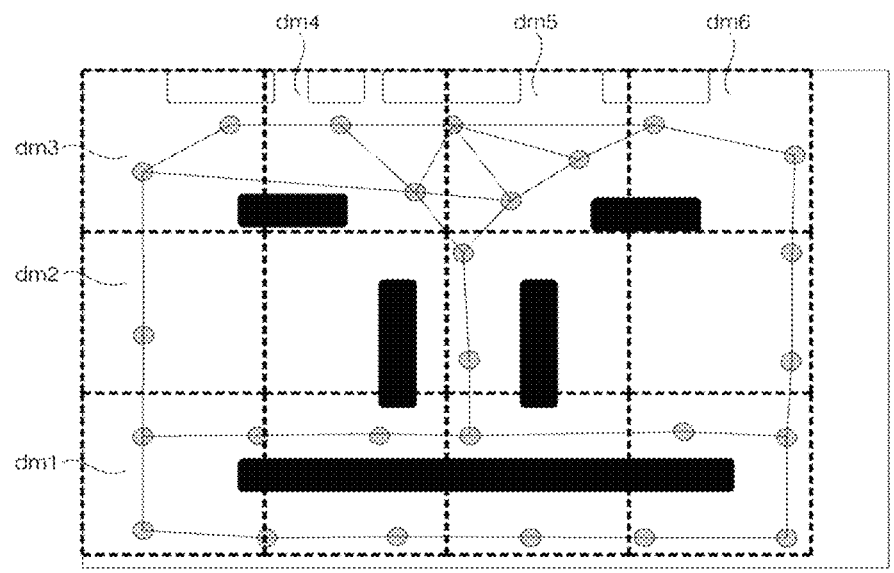

Referring to FIG. 14, the controller 740 may divide a grid map/topological map into predefined unit cells, for example, each unit cell having a size 100 m×100 m, thereby creating a plurality of divided maps dm1, dm2, dm3, dm4, dm5, dm6, . . . .

Figure 15:
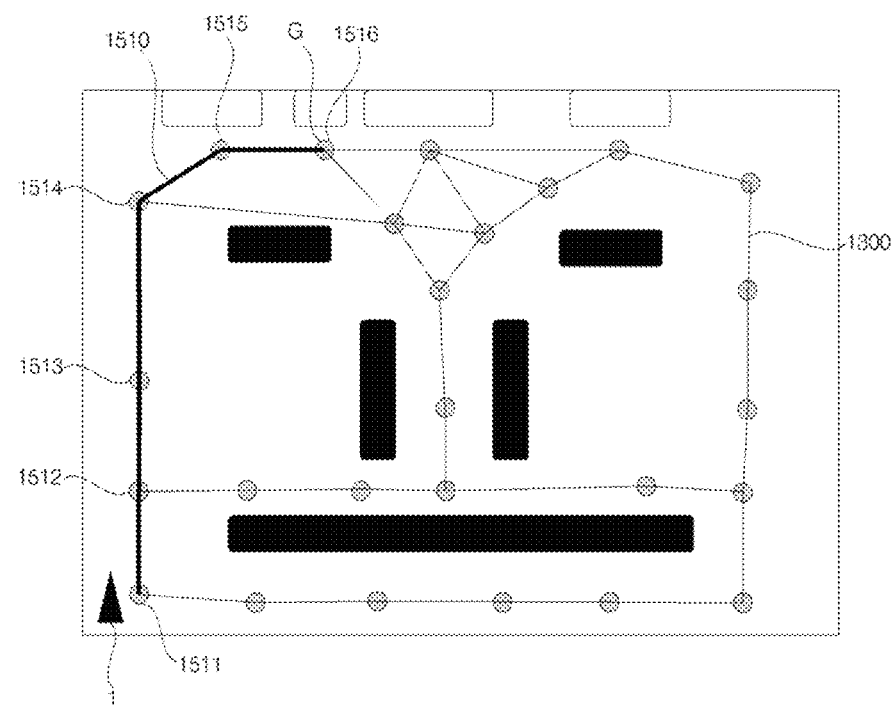

In one example, when the user requests a guide to a predefined destination G using a voice or touch input, the controller 740 may create a global route 1510 connecting a node 1511 corresponding to a current position of the moving robot 1 to a destination node 1516 corresponding to the destination G as shown in FIG. 15.

This eliminates a need to load the entire grid map, thereby improving the data processing rate and the global route creation speed.

The global route 1510 may include a plurality of nodes 1511, 1512, 1513, 1514, 1515, and 1516 in sequence.

Figure 16:
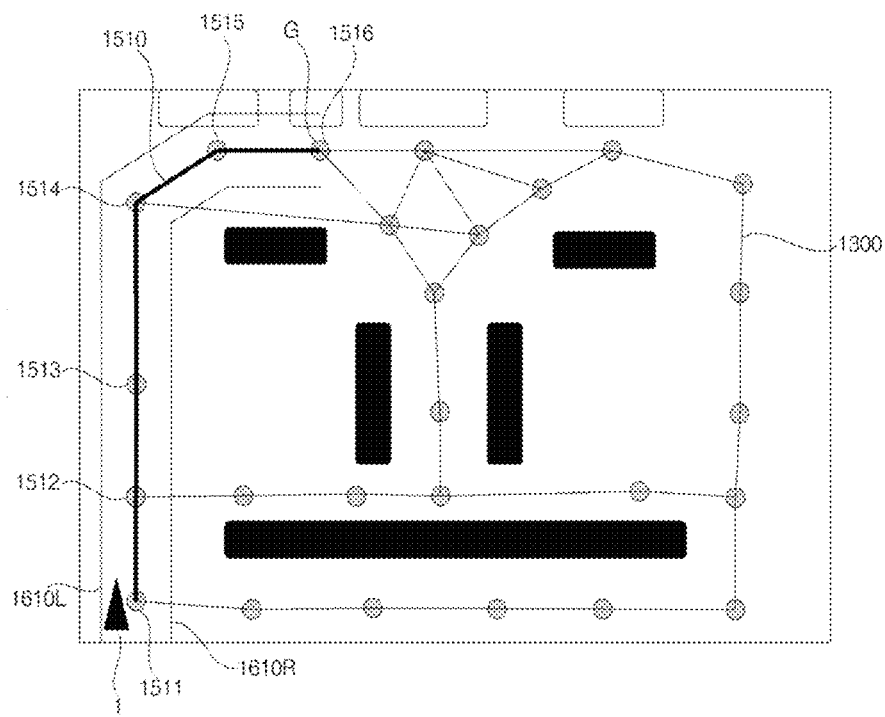

Further, referring to FIG. 9A and FIG. 16, the controller may create a left travel guideline 1610L and a right travel guideline 1610R spaced, by a predefined distance, from an edge of the created global route 1510.

The left travel guideline and the right travel guideline may serve as left and right travel limit lines of the moving robot 1 when the robot is traveling and thus may serve as left and right virtual walls respectively.

Therefore, a region between the left travel guideline and the right travel guideline may be set to the travelable range of the moving robot 1.

Accordingly, in one embodiment of the present disclosure, the moving robot 1 travels within the range that does not deviate from the left travel guideline and the right travel guideline.

In one example, a width of the travelable range may be determined based on the size of the moving robot and the size of the preset moving obstacle.

Further, the width of the travelable range may vary based on a situation at the current position of the moving robot 1 and/or an attribute of a public place in which the moving robot 1 is placed.

Figure 17:
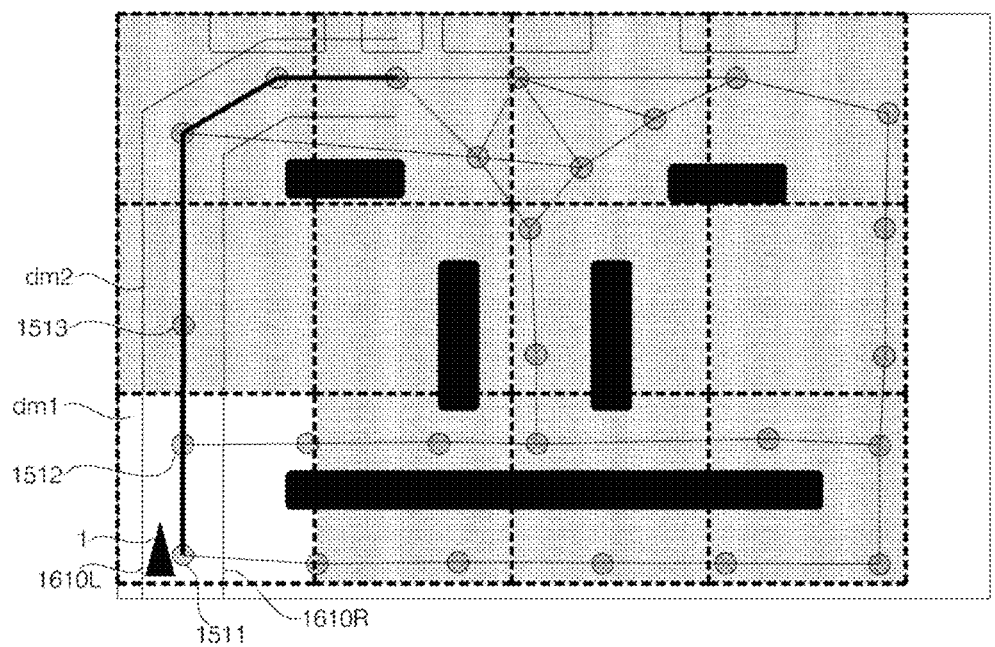

Referring to FIG. 17, the moving robot 1 is positioned at a first node 1511 of the global route 1510, while the next target node is a second node 1512.

Thus, the controller 740 loads only a first divided map dm1 including the first node 1511 and second node 1512 among the divided maps of the grid map, and then, based on the first divided map dm1, may create a local route to the second node 1512 and may control the robot to travel to the second node based on the created route.

This eliminates a need to load the entire grid map, thereby improving the data processing rate and the local route creation speed.

Further, the local route may be created within the travelable range between the left travel guideline 1610L and right travel guideline 1610R.

Figure 18:
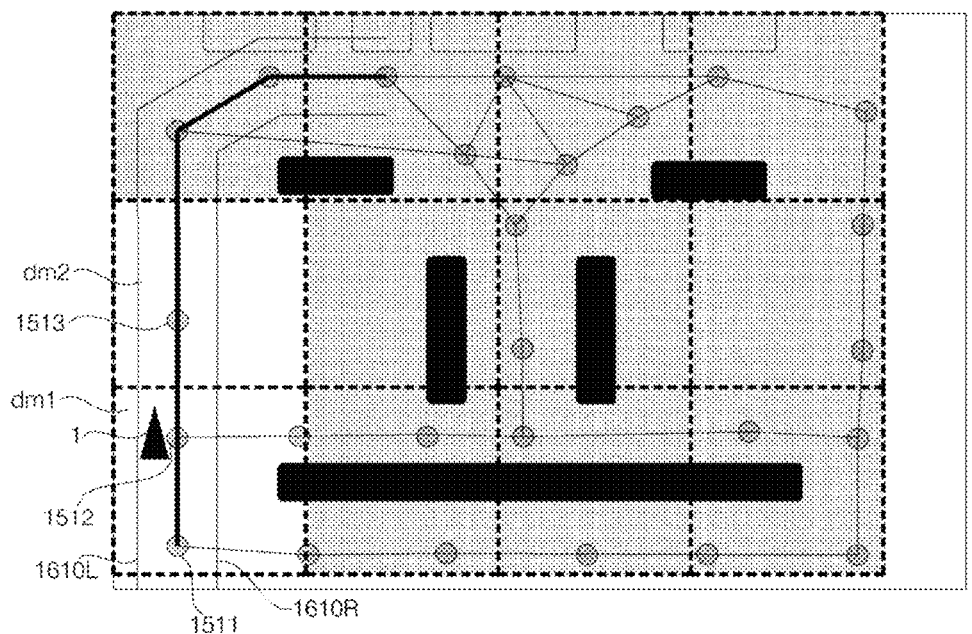

Referring to FIG. 18, when the moving robot 1 travels to the second node 1512, the next target node becomes a third node 1513.

In this case, the controller 740 loads only a second divided map dm2 including the third node 1513 and, then, based on the second divided map dm2, may create a local route to the third node 1513 and may control the robot to travel to the third node based on the created route. In this case, the local route may be created within the travelable range between the left travel guideline 1610L and right travel guideline 1610R.

Further, in the same way, the moving robot 1 may travel to a fourth node 1514.

Figure 19:
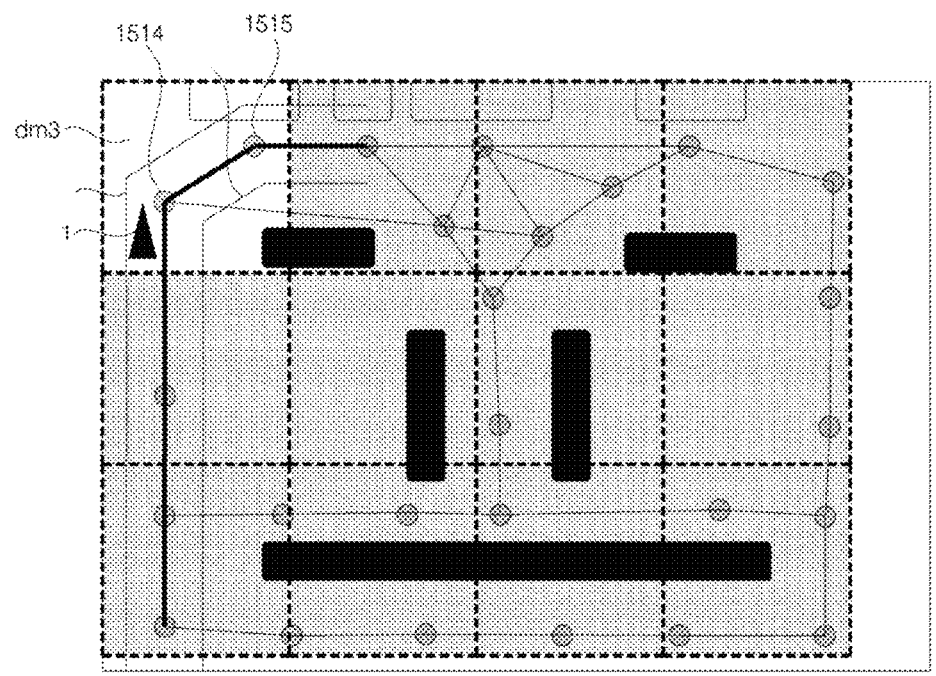

Referring to FIG. 19, the moving robot 1 is positioned at the fourth node 1514 of the global route 1510. Thus, a next target node becomes a fifth node 1515.

In this case, the fourth node 1514 and the fifth node 1515 are both included in the same third divided map dm3. Thus, the controller 740 may create a local route without having to load another divided map and may control the robot to travel to the fifth node based on the created route.

In this case, the local route may be created within the travelable range between the left travel guideline 1610L and right travel guideline 1610R.

A predefined divided map such as the third divided map dm3 may include plurality of nodes. In some cases, for example, for a central point of a long corridor, a divided map that does not include a node may be created.

Figure 20:
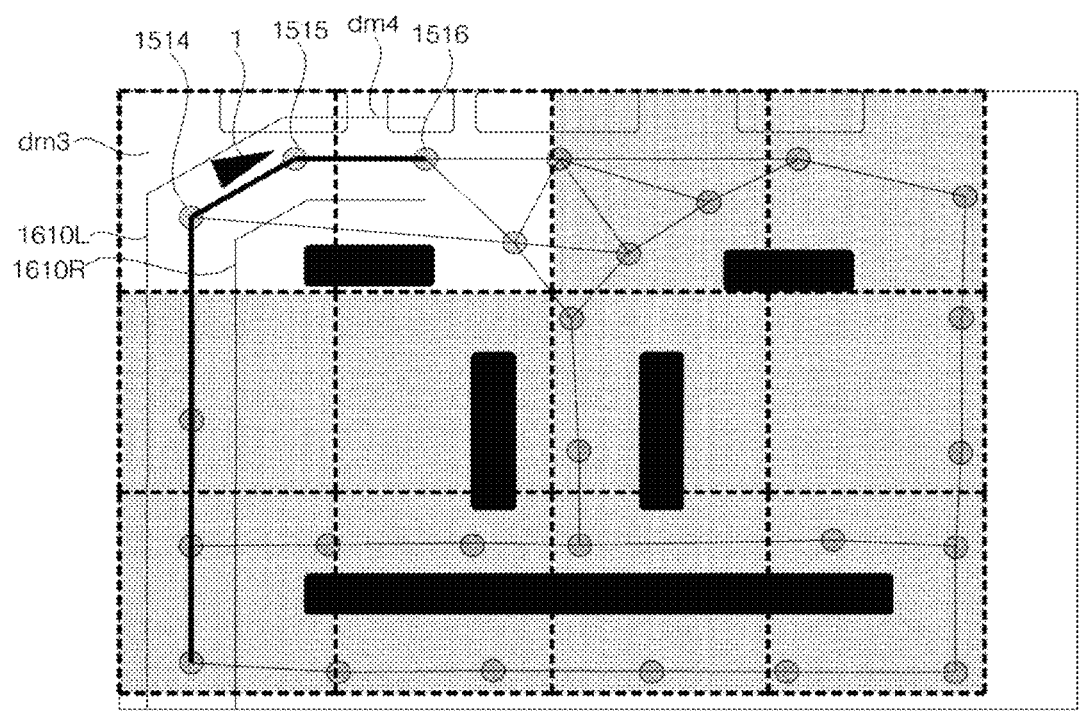

In one example, referring to FIG. 20, when the moving robot 1 travels to the fifth node 1515, a next target node becomes the destination node 1516.

The moving robot 1 loads a fourth divided map dm4 including the destination node 1516, and, then, based on the fourth divided map dm4, may create a local route to the destination node 1516 and may control the robot to travel to the destination node based on the created route. When the robot 1 reaches the destination node 1516, the guiding service may be terminated.

In this case, the controller may create the local route within the travelable range between the left travel guideline 1610L and the right travel guideline 1610R.

In one example, creating the local route within the travelable range as described above with reference to FIG. 17 to FIG. 20 may maintain a travel straightness in the guide mode, so that the user does not feel discomfort due to frequent movement direction changes.

That is, when the moving robot guides a person to a destination, the moving robot may travel while maintaining the travel straightness without changing the travel direction.

As a result, the guide requester may have minimized change in direction and thus may travel comfortably while following the moving robot.

Further, the travelling while avoiding the obstacle may be executed within the travelable range. This may prevent creation of an unnecessary travel route which may otherwise occur when the robot has a big bypass to avoid an obstacle.

According to one embodiment of the present disclosure, the stationary obstacle may be considered only in the global route creation, and may not be considered in the creation of the travel guideline.

For example, the global route may be created to have a set of nodes with no obstacles therebetween. The left and right travel guidelines may be respectively set on the left and right sides around the global route, regardless of the presence or absence of the stationary obstacle.

Figure 21:
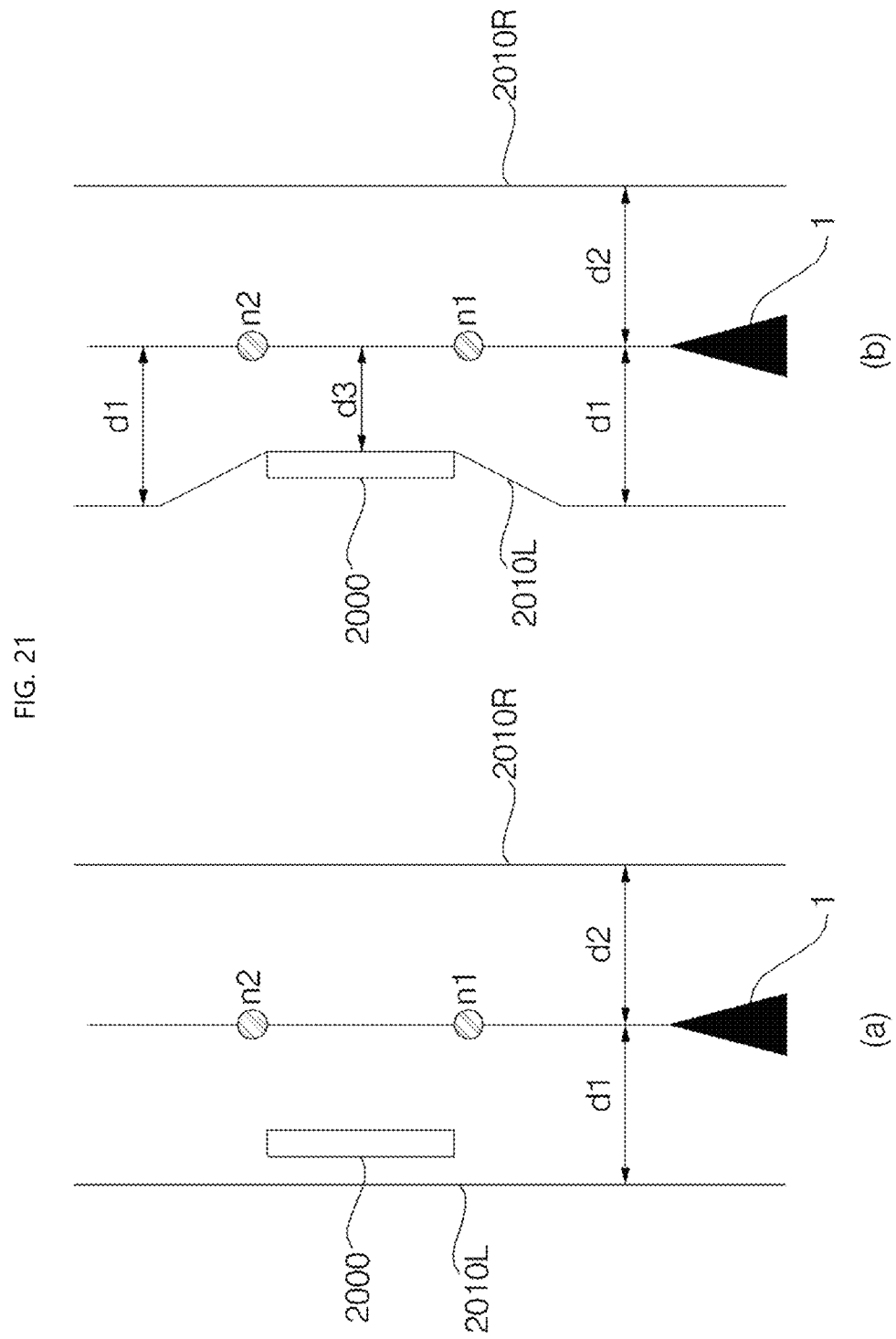

Referring to (a) in FIG. 21, a global route through a first node n1 and a second node n2 may be assumed. In this case, left and right travel guidelines 2010L and 2010R may be set on the left and right sides around the global route respectively.

In one example, a distance d1 between the global route and the left travel guideline 2010L may be usually the same as a distance d2 between the global route and the right travel guideline 2010R. However, in some cases, the distance d1 may be different from the distance d2.

Referring to (a) in FIG. 21, there is present a stationary obstacle 2000 between the global route and the left travel guideline 2010L.

The controller may create a global route so that the moving robot 1 does not pass through the stationary obstacle 2000, and then, may set the travel guidelines 2010L and 2010R around the global route.

The moving robot 1 may recognize all of the stationary obstacle 2000 and the travel guidelines 2010L and 2010R as obstacles and may travel while avoid collisions therewith.

In one example, when the robot bypasses the stationary obstacle 2000 outwardly of the left travel guidelines 2010L, the robot may deviate out of the travelable range. Further, this bypass may cause a great travel distance increase. Thus, the guide target may feel uncomfortable.

Further, the controller may compute an unnecessary region when the robot bypasses the stationary obstacle 2000.

Thus, according to one embodiment of the present disclosure, the controller may vary the width of the travelable range based on the stationary obstacle 2000.

Referring to (b) in FIG. 21, when the controller sets the travel guidelines 2010L and 2010R on the left and right sides around the global route, a distance between a portion of the left travel guideline 2010L and the global route may vary to be below a distance d3 between the stationary obstacle 2000 and the global route.

Accordingly, the moving robot 1 may travel in a straighter forward manner and may more rapidly determine a route to avoid the obstacle.

In one example, the width of the travelable range may vary based on a situation at a current position of the moving robot 1 and/or characteristics of the public place where the moving robot 1 is placed.

The width of the travelable range may be not set to be uniform in an entirety of the global route but to vary in a portion thereof.

For example, the width of the travelable range may vary in each section included in the global route based on the number of moving obstacles as detected.

Further, when an obstacle detection count between a first pair of two nodes may be greater than a reference obstacle detection count, a width of the travelable range between the first pair of two nodes may be greater than a width of the travelable range between a second pair of two nodes when an obstacle detection count between the second pair of two nodes may be smaller than the reference obstacle detection count.

For a region with a high human density, the controller may enlarge the width of the travelable range to avoid collision so that the moving robot 1 may travel within the enlarged range while avoiding persons.

Figure 22:
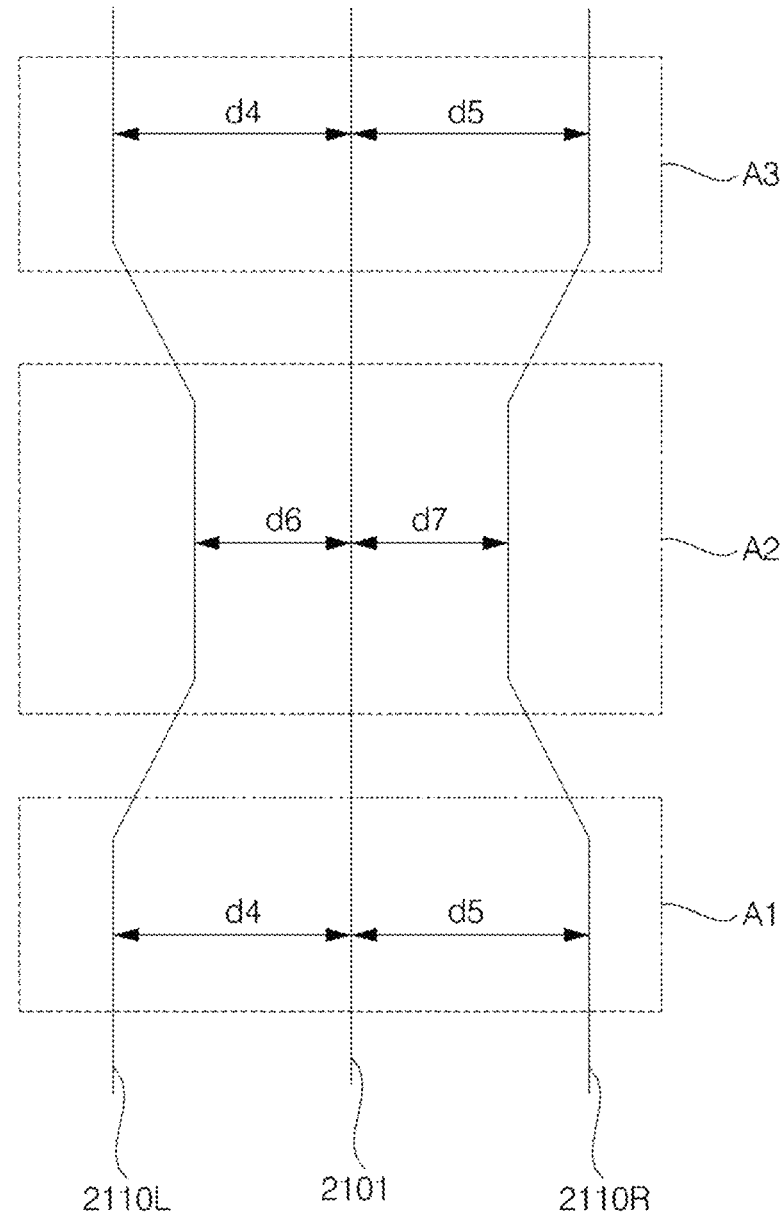

Referring to FIG. 22, the left travel guideline 2110L and the right travel guideline 2110R may be constructed such that in a first region A1 and a third region A3, the left travel guideline 2110L and the right travel guideline 2110R may be spaced apart, by predefined distances d4 and d5, from the global route 2101 respectively, while in a second region A2, the left travel guideline 2110L and the right travel guideline 2110R may be spaced apart, by predefined distances d6 and d7, from the global route 2101 respectively.

In one example, a large number of moving robots may be deployed in a large public area to provide a guide service.

In this case, the plurality of moving robots may share the travel guideline information with each other, thereby preventing collision between the robots.

Figure 23:
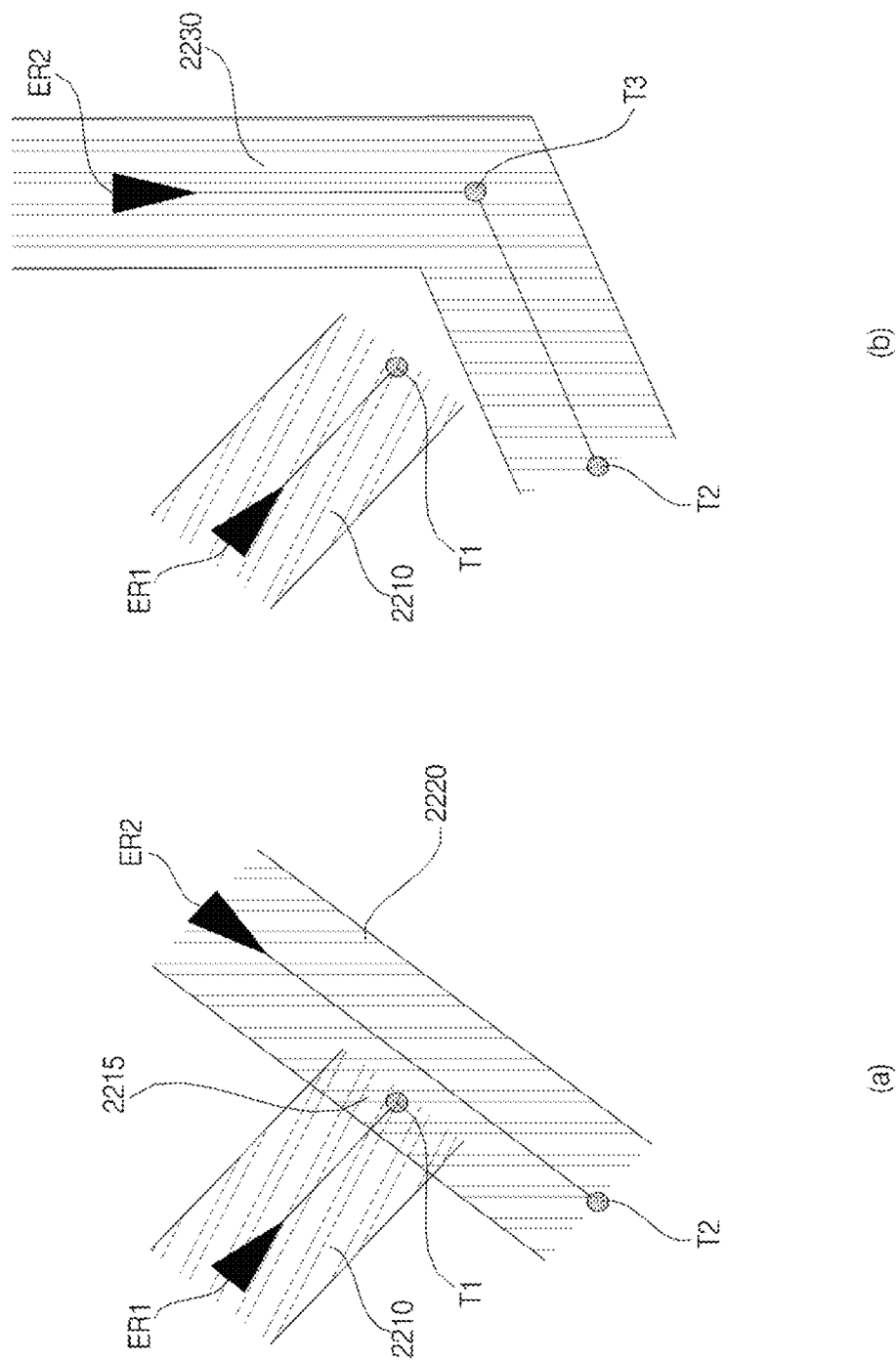

Referring to (a) in FIG. 23, a first moving robot ER1 will travel within a travelable range 2210 of a predefined range between left and right travel guidelines constructed on the left and right sides around a local route to a target node T1.

Further, a second moving robot ER2 will travel within a travelable range 2220 of a predefined range between left and right travel guideline constructed on left and right sides around a local route to a target node T2.

In this case, a region 2215 where the travelable range 2210 of the first moving robot ER1 and the travelable range 2220 of the second moving robot ER2 overlap each other may occur. A collision situation therebetween may occur depending on velocities of ER1 and ER2.

To prevent this collision, a moving robot creating a route later may set the travel route and travelable range so as not to invade a shared travelable range of another robot.

Referring to (b) in FIG. 23, the first moving robot ER1 will travel within the travelable range 2210 of the predefined range between left and right travel guidelines constructed on the left and right sides around the local route to the target node T1.

When the second moving robot ER2 receives the travelable range 2210 of the first moving robot ER1, the robot ER2 may create a travel guideline and a travelable range 2230 so as not to invade the travelable range 2210 of the first moving robot ER1.

Further, when necessary, the second moving robot ER2 may create a global/local route via a predefined node T3 in creation of the local route to the target node T2.

To adjust the travelable range in FIG. 23, the multiple robots may send and adjust a travelable range thereof to adjacent robots. A priority of the adjustment process may be based on a priority of a robot or a change situation of the route when adjusting the route.

According to at least one of the embodiments of the present disclosure, the robot may provide a variety of services including guide services in public places.

Further, according to at least one of the embodiments of the present disclosure, the robot may create a safe and optimal guide route when providing guide services.

Further, according to at least one of the embodiments of the present disclosure, the robot may quickly create the route to the guide destination, thereby to improve the guide service provision speed and the robot travel performance.

With reference to FIG. 24 to FIG. 27, a process to load a divided map based on the process in FIG. 9B will be described.

Figure 24:
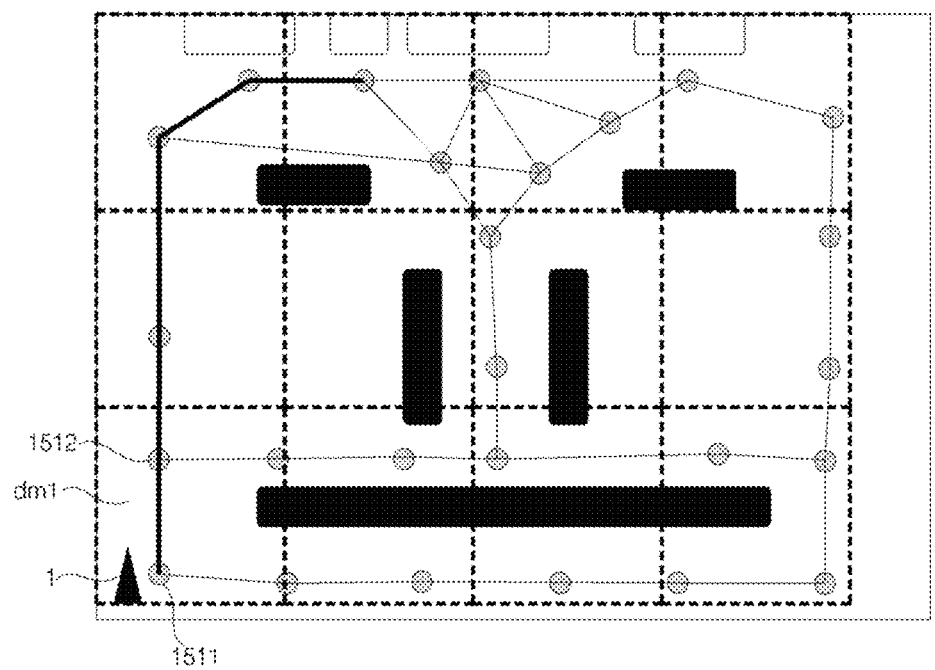

A following description may be associated with the description referring to FIG. 10 to FIG. 15. Referring to FIG. 24, the moving robot 1 is positioned at a first node 1511 of a global route 1510, and a next target node is a second node 1512.

Thus, the controller 740 may load only a first divided map dm1 including the first node 1511 and second node 1512, among the divided maps of the grid map, and then may create a local route to the second node 1512 based on the first divided map dm1 and may control the robot 1 to travel to the second node based on the created route.

This eliminates the need to load the entire grid map, thereby improving the data processing rate and the local route creation speed.

Figure 25:
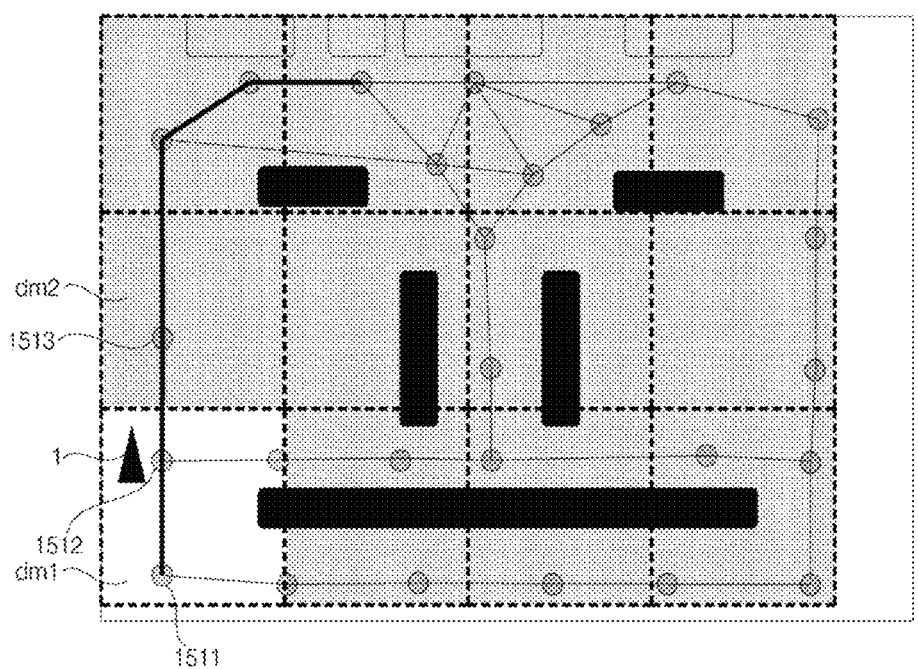

Referring to FIG. 25, when the moving robot 1 travels to the second node 1512, a next target node may be become a third node 1513.

In this case, the controller 740 may load a second divided map dm2 including the third node 1513, then and may create a local route to the third node 1513 based on the second divided map dm2 and then may control the robot 1 to travel to the third node based on the created local route.

In the same way, the moving robot 1 may travel to a fourth node 1514.

Figure 26:
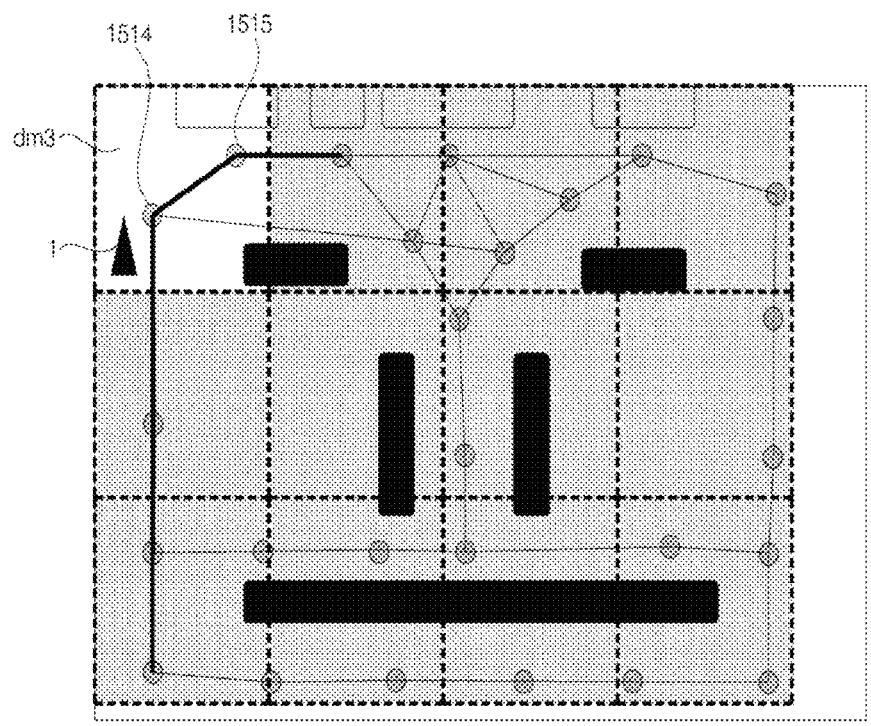

Referring to FIG. 26, the moving robot 1 may be positioned at the fourth node 1514 of the global route 1510. Thus, a next target node may be a fifth node 1515.

In this case, the fourth node 1514 and the fifth node 1515 are both included in the same third divided map dm3. Thus, the controller may create a local route to the fifth node 1515 without having to load another divided map. Then, the controller may control the robot 1 to travel to the fifth node based on the created local route.

A predefined divided map such as the third divided map dm3 may include a plurality of nodes. In some cases, for example, for a central point of a long corridor, a divided map that does not include a node may be created.

Figure 27:
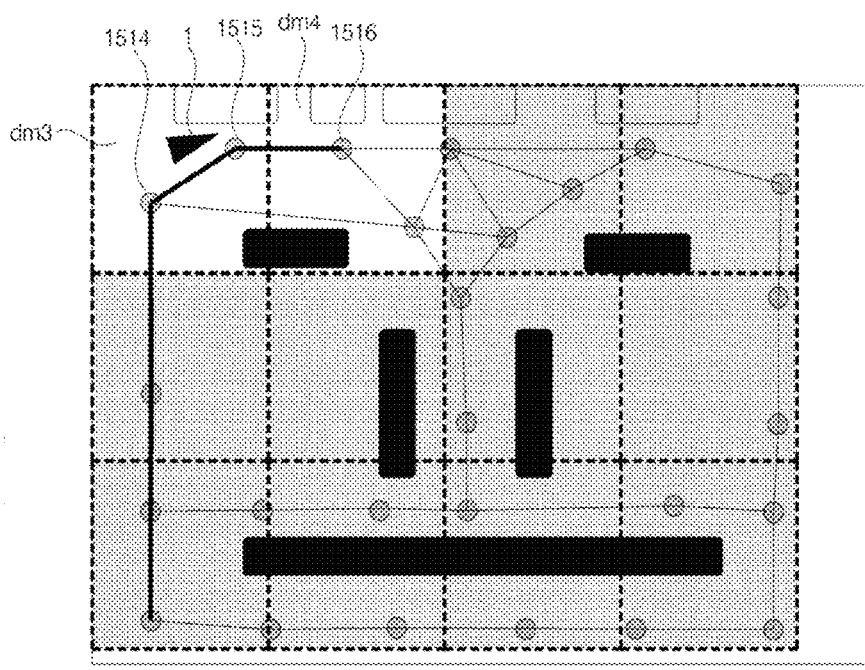

In one example, referring to FIG. 27, when the moving robot 1 has travelled to the fifth node 1515, a next target node may be the destination node 1516.

The controller may load a fourth divided map dm4 including the destination node 1516 and then create a local route to the destination node 1516 based on the fourth divided map dm4. Then, the controller may control the robot 1 to travel to the destination node based on the created local route. When the robot 1 has reached the destination node 1516, the guide service may be terminated.

According to at least one of the embodiments of the present disclosure, various services such as guidance services may be provided in public areas.

Further, according to at least one of the embodiments of the present disclosure, the robot may quickly create a route to a guidance destination, such that a guidance service rate and a robot travel performance may be improved.

Further, according to at least one of the embodiments of the present disclosure, the moving robot that may efficiently use system resources, and a method of operation thereof may be realized.

Further, according to at least one of the embodiments of the present disclosure, the robot may easily provide information displayed on the display in the service provision process of a road guide service.

The moving robot according to the present disclosure is not limited to the configurations and methods of the embodiments as described above. However, all of some of the embodiments may be selectively combined with each other so that various modifications may be made.

A method for operating a moving robot according to one aspect of the present disclosure may include receiving a guide destination input; creating a global route to the received guide destination; creating a left travel guideline and a right travel guideline respectively on left and right sides around the created global route; and creating a local route within a travelable range, wherein the travelable range is defined between the left travel guideline and the right travel guideline. Thus, the method may create a safe and optimal guidance route when providing a guidance service.

A method for operating a moving robot according to another aspect of the present disclosure may include setting a plurality of node nodes in a grid map; extracting coordinates of the plurality of nodes; creating an edge between nodes, wherein the nodes are spaced from each other by a distance smaller than or equal to a predefined value, and then creating, a topological map having the edge; and dividing the grid map into divided maps, each dived map having a predefined size. Thus, the robot may use the divided map to quickly create a route to the guide destination and improve the guidance service provision speed and the robot travel performance.

The method of operating the moving robot according to the embodiment of the present disclosure may be implemented using a code that may be read by a processor on a recording medium which may be read by the processor. The processor-readable recording medium includes all types of recording devices that store therein data that may be read by the processor. Examples of the recording media that may be read by a processor may include ROM, RAM, CD-ROM, a magnetic tape, a floppy disk, an optical data storage device, etc. Further, the medium may be implemented in a form of a carrier wave in data transmission over the Internet. Further, the processor-readable recording medium may be distributed over a network coupled computer system so that a processor-readable code is stored and executed in a distributed fashion.

Further, while the above descriptions have been illustrated and described with respect to the preferred embodiments of the present disclosure, the present disclosure is not limited to the specific embodiments as described above. Various modifications may be made by those skilled in the art without departing from a scope of the present disclosure claimed in the claims. In this connection, such modifications should not be understood individually based on a technical spirit or idea of the present disclosure.

REFERENCE NUMERAL

Moving robot: 1
Display: 710
Image acquisition unit: 720
Voice interface: 725
Storage: 730
Controller: 740
Driving assembly: 760
Communicator: 790

What is claimed is:

1. A method for operating a moving robot, the method comprising:
setting, by a controller of the robot, a plurality of nodes in a grid map;
extracting, by the controller, coordinates of the plurality of nodes;
creating, by the controller, an edge between nodes, wherein the nodes are spaced from each other by a distance smaller than or equal to a predefined value, and then creating, by the controller, a topological map having the edge;
dividing, by the controller, the grid map into divided maps, each divided map having a predefined size;
receiving, by a voice interface or a display of the robot, a guide destination input;
creating, by the controller, a global route in the grid map to the received guide destination;
creating, by the controller, a left travel guideline and a right travel guideline respectively on left and right sides around the created global route;
creating, by the controller, a local route within a travelable range;
re-creating the global route when a moving obstacle detection count within a preset reference time duration is equal or larger than a reference value for global route recreation; and
loading, by the controller, the divided map which corresponds to the local route,
wherein the travelable range is defined between the left travel guideline and the right travel guideline.

2. The method of claim 1, wherein a width of the travelable range is determined based on a size of the moving robot and a size of a preset moving obstacle.

3. The method of claim 2, wherein a distance between the left travel guideline and the global route is greater than a sum of the size of the moving robot and the size of the preset moving obstacle.

4. The method of claim 1, wherein when a detection count of an obstacle between a first pair of two nodes among the plurality of nodes is greater than a reference obstacle detection count, and a detection count of an obstacle between a second pair of two nodes among the plurality of nodes is smaller than the reference obstacle detection count, a width of a travelable range between the first pair of two nodes is greater than a width of a travelable range between the second pair of two nodes.

5. The method of claim 1, wherein a width of the travelable range varies based on a number of moving obstacles detected in each of sections constituting the global route.

6. The method of claim 1, wherein the method further comprises setting a virtual wall based on the left travel guideline and the right travel guideline, and
wherein the virtual wall is a border or forbidden region that the moving robot cannot travel.

7. The method of claim 1, wherein the method further comprises calculating a travel velocity for avoiding a detected obstacle.

8. The method of claim 1, wherein the global route is composed of a destination node corresponding to the guide destination, and a plurality of general nodes existing between the destination node and a current position of the moving robot.

9. The method of claim 1, wherein creating, by the controller, the global route includes creating, by the controller, the global route based on the topological map.

10. A method for operating a moving robot, the method comprising:
setting, by a controller of the robot, a plurality of nodes in a grid map;
extracting, by the controller, coordinates of the plurality of nodes;
creating, by the controller, an edge between nodes, wherein the nodes are spaced from each other by a distance smaller than or equal to a predefined value, and then creating, by the controller, a topological map having the edge;
dividing, by the controller, the grid map into divided maps, each divided map having a predefined size;
receiving, by a voice interface or a display of the robot, a guide destination input;
creating, by the controller of the robot, a global route to the received guide destination;
creating, by the controller, a left travel guideline or a right travel guideline respectively on a left side or a right side around the created global route;
creating, by the controller, a local route to one of a plurality of nodes;
re-creating the global route when a moving obstacle detection count within a preset reference time duration is equal or larger than a reference value for global route recreation; and
loading, by the controller, the divided map which corresponds to the local route.

11. The method of claim 10, wherein a distance between the left travel guideline and the global route or a distance between the right travel guideline and the global route is greater than a sum of a size of the moving robot and a size of the preset moving obstacle.

12. The method of claim 10, wherein the method further comprises setting a virtual wall based on the left travel guideline or the right travel guideline, and
wherein the virtual wall is a border or forbidden region that the moving robot cannot travel.

13. The method of claim 1, wherein the method further comprises dividing, by the controller, the topological map into divided maps, each divided map having the predefined size.

14. The method of claim 1, wherein creating the topological map includes: determining presence or absence of an obstacle between the nodes; and creating the edge between the nodes when the obstacle is absent between the nodes.

15. The method of claim 14, wherein determining the presence or absence of the obstacle between the nodes uses a ray tracing scheme.

16. The method of claim 1, wherein the plurality of nodes includes a destination node corresponding to a preset guide destination, and a general node for forming a route to the guide destination.

17. The method of claim 10, wherein the method further comprises dividing, by the controller, the topological map into divided maps, each divided map having the predefined size.

18. The method of claim 10, wherein creating the topological map includes: determining presence or absence of an obstacle between the nodes; and creating the edge between the nodes when the obstacle is absent between the nodes.

19. The method of claim 18, wherein determining the presence or absence of the obstacle between the nodes uses a ray tracing scheme.

20. The method of claim 10, wherein the plurality of nodes includes a destination node corresponding to a preset guide destination, and a general node for forming a route to the guide destination.

* * * * *